United States Patent
Ae et al.

(10) Patent No.: US 7,691,314 B2
(45) Date of Patent: Apr. 6, 2010

(54) METHOD OF INJECTION COMPRESSION MOLDING

(75) Inventors: Haruhiko Ae, Ichihara (JP); Yasumasa Shibata, Ichihara (JP); Takayoshi Tanaka, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 177 days.

(21) Appl. No.: 11/718,443

(22) PCT Filed: Nov. 1, 2005

(86) PCT No.: PCT/JP2005/020098

§ 371 (c)(1),
(2), (4) Date: May 2, 2007

(87) PCT Pub. No.: WO2006/049159

PCT Pub. Date: May 11, 2006

(65) Prior Publication Data

US 2008/0095982 A1    Apr. 24, 2008

(30) Foreign Application Priority Data

Nov. 2, 2004  (JP) ............................. 2004-319586
Dec. 15, 2004 (JP) ............................. 2004-362698

(51) Int. Cl.
  *B29C 45/18* (2006.01)
  *B29C 45/56* (2006.01)

(52) U.S. Cl. ............................................... 264/328.11

(58) Field of Classification Search ............ 264/328.11, 264/328.7; 425/574–576
  See application file for complete search history.

(56) References Cited

U.S. PATENT DOCUMENTS

| | | | | |
|---|---|---|---|---|
| 3,523,993 A | * | 8/1970 | Hawkins | 264/244 |
| 4,560,342 A | * | 12/1985 | Ishida et al. | 425/562 |
| 5,075,051 A | * | 12/1991 | Ito et al. | 264/40.1 |
| 5,374,183 A | * | 12/1994 | Takeuchi | 425/567 |
| 2004/0115505 A1 | | 6/2004 | Oyama | |

FOREIGN PATENT DOCUMENTS

| | | |
|---|---|---|
| JP | 2-262170 | 10/1990 |
| JP | 5 116175 | 5/1993 |
| JP | 5 253963 | 10/1993 |
| JP | 6 179228 | 6/1994 |
| JP | 6-238704 | 8/1994 |

(Continued)

*Primary Examiner*—Jill L Heitbrink
(74) *Attorney, Agent, or Firm*—Oblon, Spivak, McClelland, Maier & Neustadt, L.L.P.

(57) ABSTRACT

In an injection compression molding method, dies are clamped with low pressure and a melted thermoplastic resin composition is filled in a cavity space from a gate while moving the cavity space relative to the gate, and then the dies are clamped with a high pressure substantially simultaneously with completion of the filling to compress and form the thermoplastic resin composition filled in the cavity space. Since the thermoplastic resin composition containing a high content of thermally-conductive filler such as an electrically-conductive filler can be injected and compressed to be molded, the injection compression molding method can be applied in manufacturing molding such as a fuel cell separator and a flat antenna.

6 Claims, 18 Drawing Sheets

FOREIGN PATENT DOCUMENTS

| | | |
|---|---|---|
| JP | 7-112457 | 5/1995 |
| JP | 8 150644 | 6/1996 |
| JP | 2002 290132 | 10/2002 |
| JP | 2004-160772 | 6/2004 |
| JP | 2004 188722 | 7/2004 |
| WO | 02 01660 | 1/2002 |

* cited by examiner

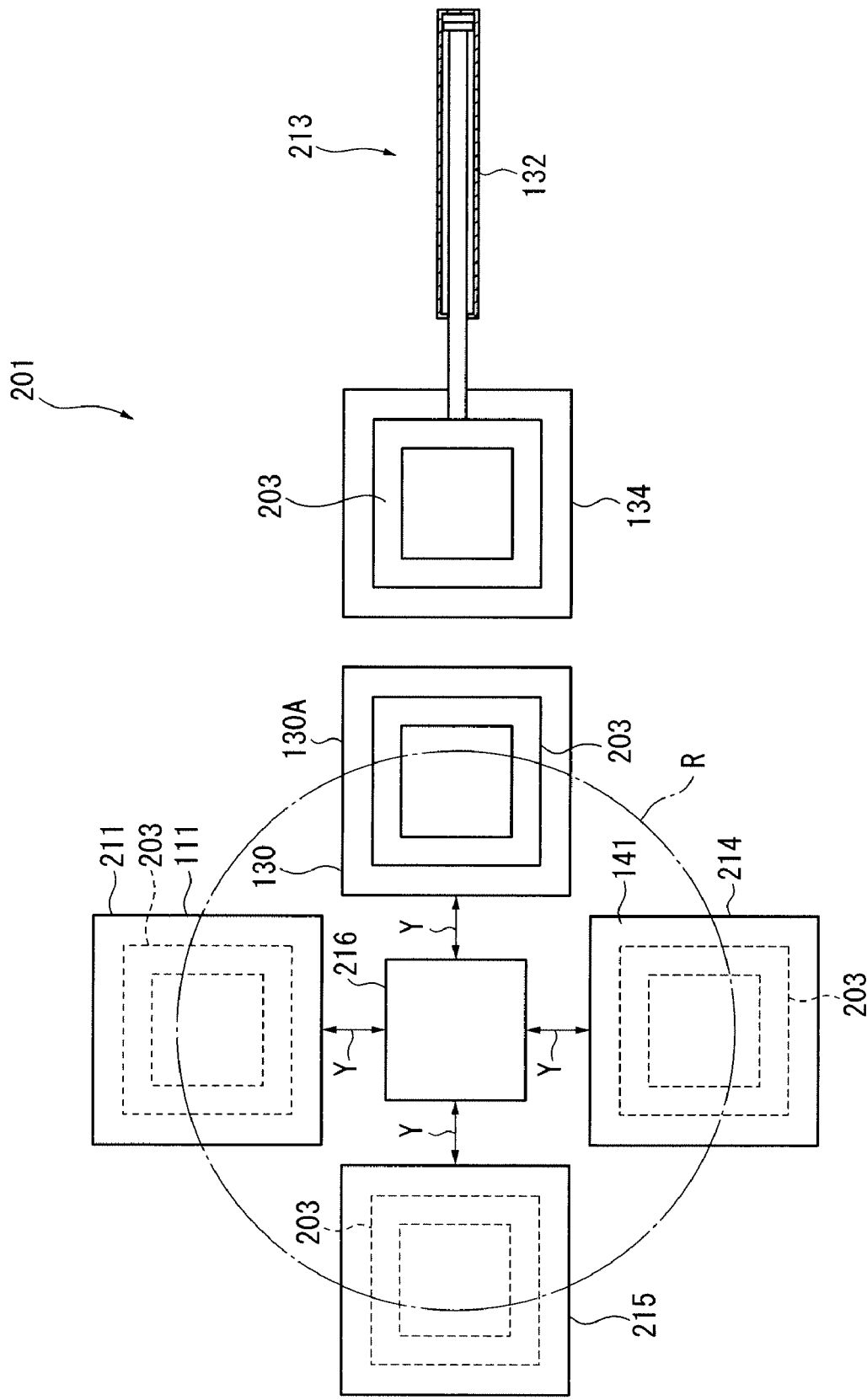

METHOD OF INJECTION COMPRESSION MOLDING

TECHNICAL FIELD

The present invention relates to an injection compression molding method of a thermoplastic resin and a molding obtained by the molding method.

BACKGROUND ART

Conventionally, various methods have been used as manufacturing methods of a molding, where an injection molding method, an extrusion molding method, etc. are known. Recently, as a molding molded by such molding methods, a molding containing a thermoplastic resin with a high content of filler mixed therein has been introduced. For instance, there is known a fuel cell separator containing a thermoplastic resin with a filler such as graphite carbon and carbon fiber mixed therein.

The fuel cell separator is disposed so as to sandwich a solid electrolyte and an air electrode and a fuel electrode arranged on both sides of the solid electrolyte in a fuel cell. The air (oxygen) and a fuel gas (hydrogen) are respectively fed to the air electrode and the fuel electrode through grooves formed on the fuel cell separator.

When a molding is formed of a material containing a high content of filler as the fuel cell separator, fluidity of the material is degraded, so that a filling pressure of the material needs to be increased to perform molding.

Then, there has been proposed a molding method such as an injection compression molding method and a rapid heating/cooling method for molding using such materials with low fluidity (see, for instance, Patent Document 1).

However, in the injection compression molding method disclosed in Reference 1, which uses a molding machine with a gate for injecting a melted resin being fixed, it has been difficult to secure uniformity of thickness of a product when a resin composition containing a high content of carbon filler and having extremely low fluidity is molded. Also, in the rapid heating/cooling method in which a die is heated to a high temperature to smoothly fill a resin, it has taken time to raise a die temperature, undesirably causing degradation of productivity with a long molding cycle.

Especially, several hundreds of the fuel cell separators are used in the fuel cell and uniformity of dimensional accuracy is important (in an example of a required performance, variation of thickness (difference between maximum value and minimum value) is desired to be 60 μm or less).

There has also been proposed another method in which a cavity of a die or a gate is slid to shorten an apparent moving distance of a melted resin composition in the cavity in order to obtain a thin molding with a uniformed property. For instance, a material molding method has been proposed, where a traveling piece having a material injection port is provided on either a fixed retainer plate or a movable retainer plate, so that the material injection port is displaced relative to a cavity surface in a filling process of a molding material (see, for instance, Patent Document 2).

Further, there has been another resin molding method in which, when a melted resin is injected into a cavity from a gate through a resin injection port and a running section, the melted resin is injected while relatively moving the gate and the cavity (see, for instance, Patent Document 3).

Patent Document 1: Pamphlet of International Publication No. WO02/001660
Patent Document 2: JP-A 6-179228
Patent Document 3: JP-A-8-150644

DISCLOSURE OF THE INVENTION

Problems to be Solved by the Invention

However, in the molding methods described above, when a resin material containing a high content of electrically-conductive filler and thus having extremely low fluidity, it is difficult to transcribe fine grooves as required in a fuel cell polymer separator only by shortening the apparent moving distance of the resin, and further, a conductive performance and a mechanical strength of the grooves cannot be satisfied. On the other hand, in order to enhance a transcription performance, the content of the filler requires to be reduced, which causes degradation of the conductive performance, so that improvement of the molding method has been demanded.

Although an example of a fuel cell polymer separator is described above, a flat antenna that has been recently diffused is also molded with a similar material, which has faced a similar problem.

An object of the present invention is to provide: an injection compression molding method that can easily obtain a molding having almost no density gradient with components dispersed uniformly, uniformed thickness and excellent dimensional accuracy, even when a thermoplastic resin composition having very low fluidity in a melted state is used; and a molding obtained by the method.

Another object of the present invention is to provide: an injection compression molding method capable of shortening a molding cycle even when a material with extremely low fluidity in a melted state is used, as well as enhancing productivity of a molding; and a molding obtained by the method.

Means for Solving the Problems

An injection compression molding method according to an aspect of the present invention for obtaining a molding by injecting and filling a melted material containing a thermoplastic resin in a cavity space formed in dies through a gate and by compressing and forming the material in the cavity space includes: an injection filling step for clamping the dies with a low pressure and injecting and filling the melted material in the cavity space from the gate while moving the cavity space relative to the gate; and a compression forming step for clamping the dies with a high pressure substantially simultaneously with completion of the filling to compress and form the material filled in the cavity space.

Here, the dies are clamped with the low pressure in the injection filling step, in a case where a size of the molding is, for instance, A4 size (approx. 200 mm×300 mm), a clamping force may be around 10 to 100 tons, while when the dies are clamped with the high pressure in the compression forming step, the clamping force may be around 200 to 350 tons.

Incidentally, the injection compression molding method according to the aspect of the present invention includes, in addition to a molding method of the thermoplastic resin itself, an injection compression molding method of a thermoplastic resin composition containing a thermoplastic resin and a thermally-conductive filler such as an electrically-conductive filler and a metal filler.

According to the injection compression molding method of the present invention, the dies are clamped with the low pressure and the melted material is injected and filled while moving the cavity space relative to the gate, and then the dies are clamped with the high pressure substantially simultaneously with the completion of the filling to compress and form the material having been filled in the cavity space. Thus, even when a thermoplastic resin composition containing the high content of thermally-conductive filler such as the electrically conductive filler and the metal filler and having low fluidity in the melted state is molded as the material, an unfilled part in the cavity space is continuously formed just below the injection port of the gate, which shortens an apparent flowing length of the material, allowing the molding having uniformed density with almost no density gradient to be obtained. Also, the molding having great dimensional accuracy with small thickness distribution can be obtained, and further, even when a complex shape such as fine grooves is formed on the molding, the fine grooves can be prevented from being broken or chipped.

According to the injection compression molding method of the present invention, since the melted material is filled while moving the cavity space to cause the apparent flowing length of the melted material to be shortened, the melted material can be filled with low filling pressure and at a die temperature around crystallization temperature of the thermoplastic resin in a short time (e.g. 1 to 2 seconds), so that good moldability can be achieved. Further, since rapid heating/cooling of the die is not required, the molding cycle can be greatly shortened, thus lowering production cost.

In the injection compression molding method according to the present invention, it is preferable that: a direction in which the material is injected and filled forms an acute angle with a moving direction of the cavity space; and the acute angle is in the range of 25° to 75°.

According to the aspect of the present invention, since the direction in which the material is injected and filled forms an acute angle with the moving direction of the cavity space, specifically 25° to 75°, the filling pressure of the material being filled in the cavity space can be lowered and generation of fine weld marks can be prevented. Thus, even in a case where, for instance, a molding such as a fuel separator that requires formation of fine grooves is molded, the fine grooves can be prevented from being broken or chipped, thus enhancing strength.

In the injection compression molding method according to the present invention, it is preferable that the compression forming is performed by moving a compression block disposed in the dies toward the cavity space.

According to the aspect of the present invention, since the compression forming of the material filled in the cavity space is performed by moving forward the compression block disposed in the die toward the cavity space, the compression forming of the material filled in the cavity space can be performed easily and securely.

In the injection compression molding method according to the present invention, it is preferable that a manufacturing machine including: dies having a pair of molding dies disposed opposite to each other with the cavity space formed therein; a heating device for heating at least one of the molding dies which has a dent as the cavity space; a filling device for filling the melted material in the cavity space; a compressing device for compressing and forming the material filled in the cavity space; a cooling device for cooling the material in the cavity space; and a carrying device for carrying the dies or one of the molding dies to the respective devices is used, the heating device, the filling device, the compressing device and the cooling device being arranged substantially on a single circle. Further, it is preferable to perform a heating step with the heating device for heating the dies or one of the molding dies, a filling step with the filling device for filling the melted material in the cavity space while moving the cavity space relative to the gate, a compression forming step with the compressing device for compressing and forming the material in the cavity space, and a cooling step with the cooling device for cooling the material in the cavity space.

Here, according to the aspect of the present invention, the carrying device may carry one of the molding dies or the entire dies including the pair of molding dies.

According to the present invention, since the material is filled while moving the cavity space in the filling step, the material can be spread uniformly in the cavity space even when the material has low fluidity. With the arrangement, the uniformity of the thickness of the molding can be secured.

Further, since the material is filled while moving the cavity space in the filling step, the apparent flowing length of the material is shortened, so that high filling pressure becomes unnecessary in filling the material.

Thus, in a case where the molding is, for instance, a fuel cell separator, formation of a skin that causes increase of electrical resistance can be prevented.

Further, since the material is filled while moving the cavity space in the filling step, the uniformity of the thickness of the molding can be secured, so that, unlike conventional methods, the rapid heating/cooling of the die is not required, thus greatly shortening the molding cycle.

Still further, since the material is filled while moving the cavity in the filling step, generation of the weld marks can be prevented, thus enhancing the strength of the molding.

For instance, when a through-hole (opening) or the like which intersects with a direction in which the material of the molding is introduced is formed on the molding, since the material flows around the through-hole, the flow of the material collides in the vicinity of the through hole, which might cause generation of the weld marks. On the other hand, by filling the material while moving the cavity space as in the present invention, the flow of the material can be prevented from colliding in the vicinity of the through hole, thus preventing generation of the weld marks.

According to the molding method of the present invention, the molding is manufactured using the manufacturing machine including the heating device, the filling device, the compressing device, the cooling device and the carrying device for carrying the dies or the molding dies to the respective devices, the heating device, the filling device, the compressing device and the cooling device being arranged substantially on a single circle.

In the manufacturing machine described above, since the dies or the molding die can be carried to the filling device by the carrying device after heating the dies or the molding dies by the heating device, the next dies or the next molding die can be heated while the current one is filled by the filling device. With the arrangement, the molding can be manufactured continuously, so that productivity of the molding can be enhanced.

Since the manufacturing machine used in the present invention includes the heating device, the filling device, the compressing device and the cooling device arranged substantially on the single circle, it saves spaces as compared to a machine having the respective devices arranged linearly.

In the injection compression molding method according to the present invention, it is preferable that a temperature of the dies or one of the molding dies is set to equal to or higher than a melting point of the thermoplastic resin in the filling step, and the temperature of the dies or one of the molding dies is so adjusted that the temperature reaches a temperature equal to or lower than a crystallization temperature of the thermoplastic resin after starting the compression forming in the compression forming step.

According to the present invention, since the temperature of the dies or one of the molding dies is set to be equal to or higher than the melting point of the thermoplastic resin in the filling step, the fluidity of the thermoplastic resin contained in the material to be filled in the cavity space can be enhanced in the filling step. With the arrangement, the material can be spread more uniformly in the cavity space.

By controlling the temperature of the dies or one of molding dies so as to reach the temperature equal to or lower than the crystallization temperature of the thermoplastic resin after starting the compression forming, in a case where transcription is performed on the material in the cavity space in the compression forming step, the transcription performance can be enhanced.

A molding according to another aspect of the present invention is obtained by molding a material containing a thermoplastic resin and a thermally-conductive filler using the above-described injection compression molding method of the present invention.

According to the molding of the present invention, the thermoplastic resin composition containing the thermally-conductive filler such as the electrically-conductive filler and the metal filler is molded using the above-described injection compression molding method of the present invention, advantages described above can be attained.

In other words, the molding has almost no density gradient with the thermally-conductive filler dispersed uniformly, while having great dimensional accuracy with small thickness distribution, and further, even when a complex shape such as the one having fine grooves is formed on the molding, the fine grooves can be prevented from being broken or chipped.

In the molding according to the present invention it is preferable that the material contains 60 wt % or more of the thermally-conductive filler of the total material.

According to the present invention, since the molding is formed of the thermoplastic resin composition containing 60 wt % or more of the thermally-conductive filler such as the electrically-conductive filler and the metal filler, the molding can attain the advantages described above and can be provided with high electrical conductivity.

Since the molding of the present invention has advantages described above, the molding can exert the advantages to the maximum extent when being applied to the fuel cell separator or the flat antenna.

In the molding according to the present invention, it is preferable that a plurality of grooves are integrally formed on a surface of the molding. In the molding according to the present invention, it is preferable that a width L1 of a bottom part of a protruded tread sandwiched between the grooves is 0 to 10 mm, a width L2 of a top of the protruded tread is 0 to 10 mm (required to be L1≧L2), a height H of the protruded tread is 0.2 mm or more, a width W of each of the grooves is 5 mm or less, and a pitch P of the grooves is 15 mm or less.

At this time, a vertical cross section of the protruded tread can have any shape such as quadrate, rectangle, trapezoid, semi-sphere, triangle and semi-sphere with a part thereof being cut.

BRIEF DESCRIPTION OF DRAWINGS

FIG. 7 is a schematic diagram showing a manufacturing machine according to a fourth embodiment of the present invention;

| EXPLANATION OF CODES | |
|---|---|
| 1: | injection compression molding unit |
| 11, 12: | die |
| 11a, 12a: | die |
| 11b, 12b: | die |
| 13: | cavity space |
| 14: | compression block |
| 15: | cavity block |
| 16: | thermoplastic resin composition as a material |
| 17: | slide cylinder |
| 18: | compression cylinder |
| 19a, 19b: | spring |
| 20: | injection unit |
| 30: | gate |
| 30a, 30b, 30c: | gate |
| 50: | fuel cell |
| 51: | fuel electrode |
| 52: | electrolyte plate |
| 53: | oxidized pole plate |
| 54: | fuel cell separator as a molding |
| 55: | groove |
| α:: | angle |
| 201: | manufacturing machine |
| 203: | molding die |
| 211: | heating device |
| 213: | filling device |
| 214: | compressing device |
| 215: | cooling device |
| 216: | carrying device |
| 231: | cavity space |

BEST MODE FOR CARRYING OUT THE INVENTION

Embodiments of the present invention will be described below with reference to the attached drawings.

FIRST EMBODIMENT

Figure 1A:
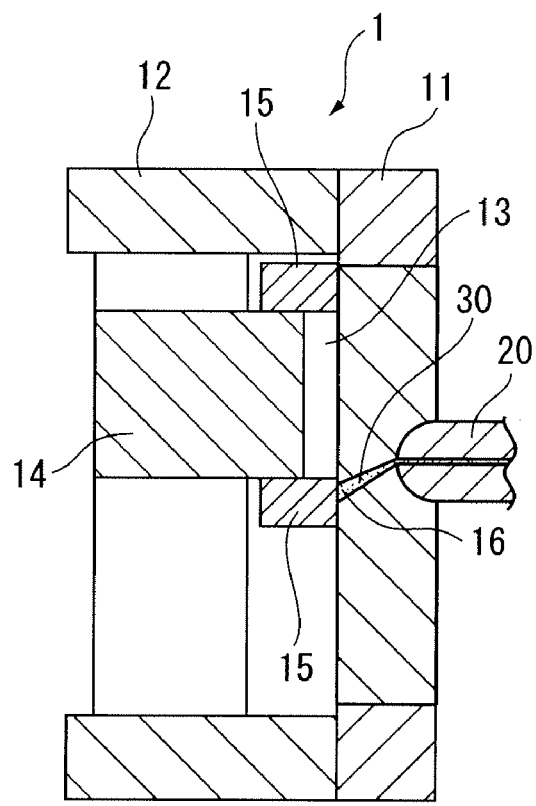
FIG. 1A is a schematic diagram showing a state in starting injection of an injection compression unit according to a first embodiment of the present invention.
Figure 1B:
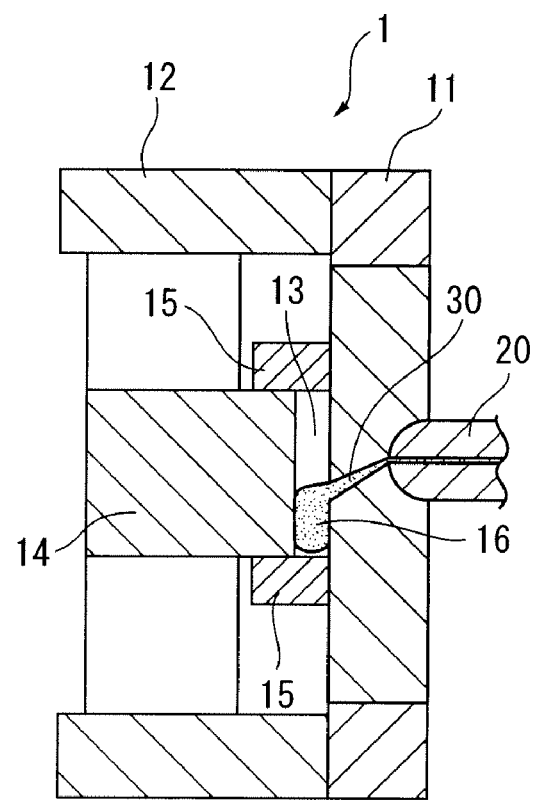
FIG. 1B is a schematic diagram showing a state during injection of the injection compression unit according to the first embodiment.
Figure 1C:
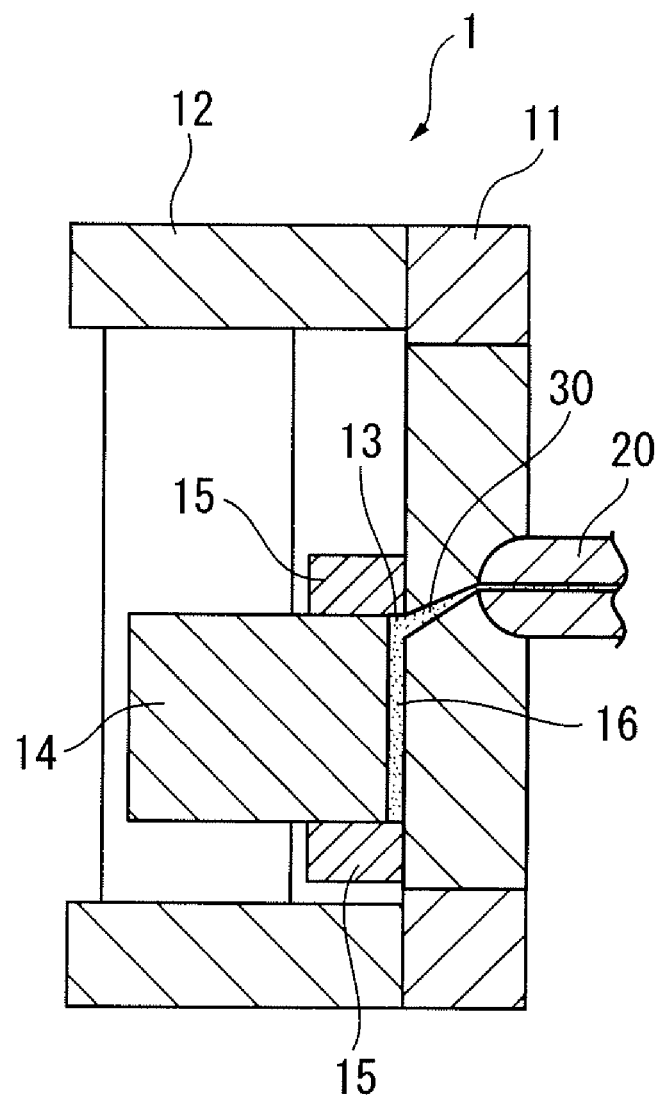
FIG. 1C is a schematic diagram showing a state during compression of the injection compression unit according to the first embodiment.

FIGS. 1A to 1C are schematic diagrams respectively showing an injection compression molding unit 1 performing an injection compression molding method of the present invention (hereinafter, simply referred to as "molding method of the present invention" in some cases), in which FIG. 1A shows a state in starting injection filling, FIG. 1B shows a state during injection filling, and FIG. 1C is a state in compression forming after completion of the injection filling.

Examples of the thermoplastic resin that can be used in the injection compression molding method of the present invention are not particularly limited and known thermoplastic resins can be appropriately used depending on applications and the like of a molding to be molded.

When a fuel cell separator is molded, it is preferable to use a resin material having heat resistance, water resistance and chemical resistance, examples of which include a polyphenylene sulfide (PPS) resin, an acrylonitrile butadiene styrene (ABS) resin, a polycarbonate (PC) resin, a polyphenylene oxide (PPO) resin, a polyacetal resin, a syndiotactic polystyrene (SPS) resin, etc, and one of those materials can be used singularly or two or more of those materials can be used in combination. In implementing the method of the present invention, the polyphenylene sulfide (PPS) resin is preferable for manufacturing the fuel cell separator, while the syndiotactic polystyrene (SPS) resin is preferable for manufacturing a flat antenna.

Further, when, for instance, the polyphenylene sulfide (PPS) resin is used as the thermoplastic resin, a polyolefin wax may be added, the polyolefin wax enhancing fluidity of the PPS resin and enhancing dispersibility of a later-described thermally-conductive filler. Also, addition of the polyolefin wax provides a thermoplastic resin composition with a preferable heat resistance.

The polyolefin wax is an artificial wax manufactured through polymerization, which includes a polyethylene wax, a polypropylene wax, an ethylene-vinyl acetate copolymer wax, and the like. In addition, the polyolefin waxes such as a polyethylene oxide wax, a polypropylene oxide wax, an MAH polypropylene copolymer wax and an oxide-ethylene-vinyl acetate copolymer wax can also be used.

A thermoplastic resin composition obtained by adding a thermally-conductive filler having various performances to the above-described thermoplastic resins can be employed. As the thermally-conductive filler, for instance, ones having thermal conductivity λ of 1.0 to 500 W/m·° C. at 20° C.

The performances of the thermally-conductive fillers include electrical conductivity, high dielectric constant and the like. Fillers having electrical conductivity (electrically-conductive filler) can be applied in, for instance, molding the fuel cell separator.

Specifically, various graphites such as a natural graphite, an artificial graphite and an exfoliated graphite, a carbon black, a carbon fiber, a vapor-grown carbon fiber, a carbon nanotube and the like can be exemplified, one of which may be used singularly or two or more of which may be used in combination. In implementing the method of the present invention, it is preferable to use a graphite having small electrical resistibility with great electrical conductivity and having good dispersibility.

Incidentally, shapes of the electrically-conductive fillers are preferably spherical or powdery with, for instance, average particle size of 10 to 200 µm and bulk specific gravity of 0.15 to 0.90 g/cm$^3$.

In molding the flat antenna, for instance, fillers having a high dielectric constant (high dielectric constant filler, highly-dielectric filler) such as a calcium titanate, a magnesium titanate, a barium titanate, a strontium titanate, a neodymium titanate and a titanium oxide can be used. Shapes of the high dielectric constant fillers are preferably spherical and powdery with, for instance, average particle size of 0.1 to 10 µm.

In molding a radiator plate, for instance, metal powders such as gold powder, iron powder, copper powder and nickel powder can be used as the thermally-conductive filler. The average particle size of the metal powders may be around 0.1 to 10 µm, 1 to 20 µm should be more preferable in use.

A thermoplastic resin composition can be obtained by mixing a thermally-conductive filler represented by the electrically-conductive filler, the high dielectric constant filler, etc. and the above-described thermoplastic resin. In obtaining the thermoplastic resin composition, 60 wt % or more, preferably 75 to 95 wt %, of the thermally-conductive filler is preferably contained in the total composition.

In the molding method of the present invention, even when the thermoplastic resin composition containing high contents of the thermally-conductive filler is used, the thermally-conductive filler can be dispersed uniformly to obtain the molding having almost no density gradient and having great dimensional accuracy with small thickness distribution, and further, even when a complex shape such as fine grooves is formed on the molding, the fine grooves can be prevented from being broken or chipped. In addition, since content of the thermally-conductive filler in the obtained molding is also high as described above, the molding has high thermal conductivity, while in case with electrically-conductive filler, the obtained molding has high electrical conductivity.

In order to obtain the thermoplastic resin composition by mixing or kneading the thermoplastic resin and the thermally-conductive filler, it is preferable to mix the both uniformly using known mixers or kneading machines such as a roller, an extruder, a kneader, Banbury mixer, Henschel mixer and a planetary mixer.

Note that an additional filler can be added to the thermoplastic resin composition containing the thermally-conductive filler and the thermoplastic resin to the extent that does not affect the advantages of the present invention.

Examples of the additional filler include fiber fillers such as a glass fiber, a potassium titanate whisker, a zinc oxide whisker, an aluminum borate whisker, an aramid fiber, an alumina fiber, a silicon carbide fiber, a ceramic fiber, an asbestos fiber, a gypsum fiber and a metal fiber, silicates such as a wollastonite, a zeolite, a sericite, a kaoline, a mica, a clay, a pyrophyllite, a bentonite, an asbestos, a talc and an aluminosilicate, metal compounds such as an alumina, a silicon oxide, a magnesium oxide, a zirconium oxide, a titanium oxide and an iron oxide, carbonates such as a calcium carbonate, a magnesium carbonate and a dolomite, sulfates such as a calcium sulfate and a barium sulfate, hydroxides such as a magnesium hydroxide, a calcium hydroxide and an aluminum hydroxide and non-fiber fillers such as a glass bead, a glass flake, a ceramic bead, a boron nitride, a silicon carbide and a silica, which may be a hollow body. Also, one of the fillers may be used singularly or two or more fillers may be used in combination. In order to obtain high mechanical strength, the fiber fillers or the non-fiber fillers may be pretreated by coupling agents such as isocyanate compound, organic silane compound, organic titanate compound, organic borate compound and epoxy compound in use.

Also, for the thermoplastic resin composition containing the thermoplastic resin and thermally-conductive filler, crystal nucleus agents such as an organic phosphorous compound, a polyetheretherketone, anti-coloring agents such as a hypophosphorous acid, antioxidants such as a hindered phenol, a hindered amine, an ultraviolet ray protective agent, coloring agents such as dye and pigment, heat stabilizer, lubricant, antistatic agent and plasticizer can be added to the extent that does not affect the advantages of the present invention.

When the molding method of the present invention using the injection compression molding unit 1 shown in FIGS. 1A to 1C is implemented, dies 11, 12 are first clamped with facing surfaces thereof facing each other, and then a melted thermoplastic resin is injected from a gate 30 connected to an injection unit 20 to be filled in a cavity space 13 defined by a compression block 14 provided in the die and two cavity blocks 15 (injection filling step).

Incidentally, a molding material to be used will be described as a thermoplastic resin composition containing a thermoplastic resin and an electrically-conductive filler in the following description.

In the molding method of the present invention, the dies 11, 12 in the injection filling step are clamped with a lower pressure around 10 to 100 tons. By clamping the dies with the lower pressure during injection filling of the resin, the cavity space 13 can be moved smoothly, so that deformation of the dies 11, 12 can be reduced and outgassing can be expected.

In the injection filling of the resin in the molding method of the present invention, by moving the cavity space 13, the resin can be filled in a wide area at high speed even with low filling pressure, the dies will not be opened even with a low clamping force.

A space of the cavity space 13 may be determined depending on type, shape, size, etc. of the molding to be molded, which may be 2 to 4 mm.

Die temperature may be determined depending on the type or the like of the molding and type of the thermoplastic resin composition 16, which may be 150 to 230° C. By setting the molding temperature to the above-described range, the molding can be cooled smoothly and thus the injection compression molding can be performed easily.

In the molding method of the present invention, after clamping the dies with a low pressure, the melted thermoplastic resin composition 16 is injected and filled in the cavity space 13 defined by the compression block 14 and the cavity blocks 15 from the gate 30 connected to the injection unit 20 while moving the cavity space 13 from the left side to the right side in the drawing (FIG. 1B).

Here, if dies having a fixed gate is used as normal injection molding, density gradient is generated between the resin near the gate and the resin at a tip of the flowing resin, which is particularly remarkable with a resin composition having low fluidity. On the other hand, in the molding method of the present invention where the melted thermoplastic resin composition 16 is filled and injected while moving the cavity space 13, an unfilled part of the cavity space 13 is continuously formed directly below an injection port of the gate 30, thus shortening an apparent flowing length of the resin composition 16. Thus, even when the thermoplastic resin composition 16 contains the high content of electrically-conductive filler and has extremely low fluidity in melted condition, the molding with almost no density gradient can be obtained.

The gate 30 used for filling the thermoplastic resin composition 16 may be a layered gate (film gate, etc.) that corresponds to the width of the cavity space 13. As another type of the gate 30, for instance, a known film gate of hot-runner molding having a gate shut/open valve may be used.

In the embodiment shown in FIGS. 1A to 1C, the gate 30 may be formed so as to form an acute angle with a moving direction (rightward in FIGS. 1A to 1C) of the cavity space 13, so that a direction in which the thermoplastic resin composition 16 is injected and filled forms an acute angle with the moving direction of the cavity space 13. With the arrangement, the filling pressure of the resin can be lowered and generation of fine weld marks on a surface of the molding can be prevented, so that when a fuel cell separator having a lot of fine grooves is molded as the molding, the fine grooves can be prevented from being chipped.

Figure 2:
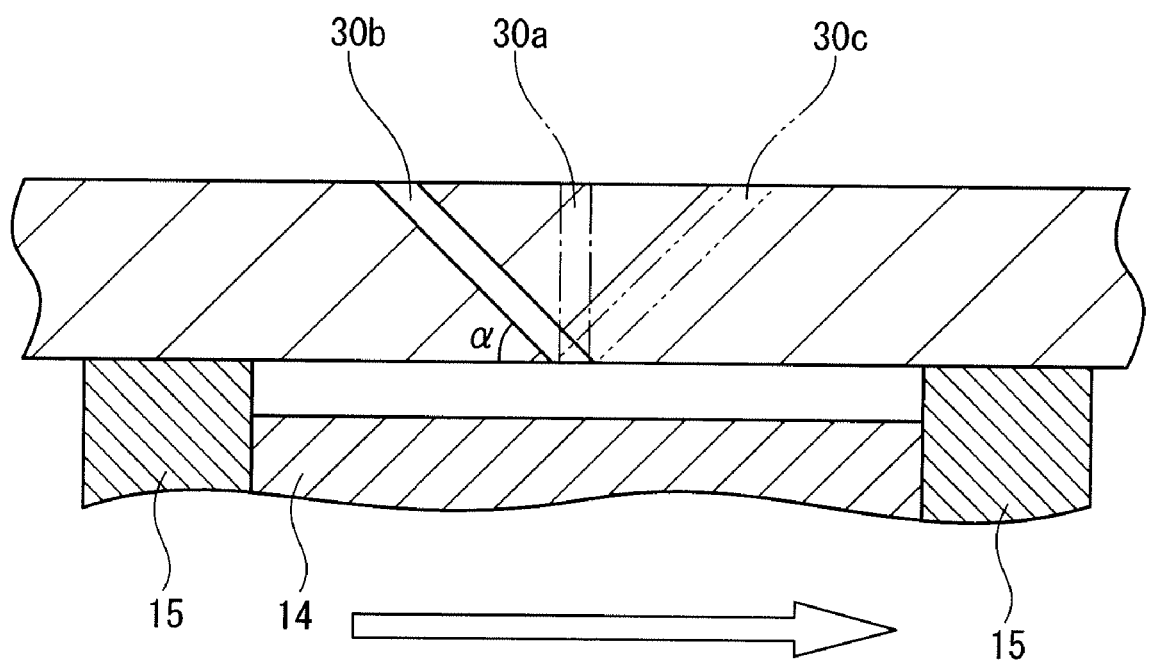
FIG. 2 is a schematic diagram showing a relationship between an angle of a gate for filling a thermoplastic resin and a moving direction of a cavity space according to the first embodiment.

FIG. 2 is a schematic diagram showing a relationship of an angle of the gate 30 for filling the thermoplastic resin composition 16 (a direction in which the thermoplastic resin composition 16 is injected and filled) and the moving direction of the cavity space 13.

Here, arrangements of the gate 30 are shown respectively by a gate 30a (shown by a chain line in FIG. 2) being arranged to form the right angle with the moving direction of the cavity space 13, a gate 30b (shown by a solid line in FIG. 2) being arranged to form an acute angle with the direction of the cavity space 13, and a gate 30c (shown by a chain double-dashed line in FIG. 2) being arranged to form an obtuse angle with the moving direction of the cavity space 13. An angle α is an angle formed by the gate 30b and the moving direction of the cavity space 13.

Figure 3A:
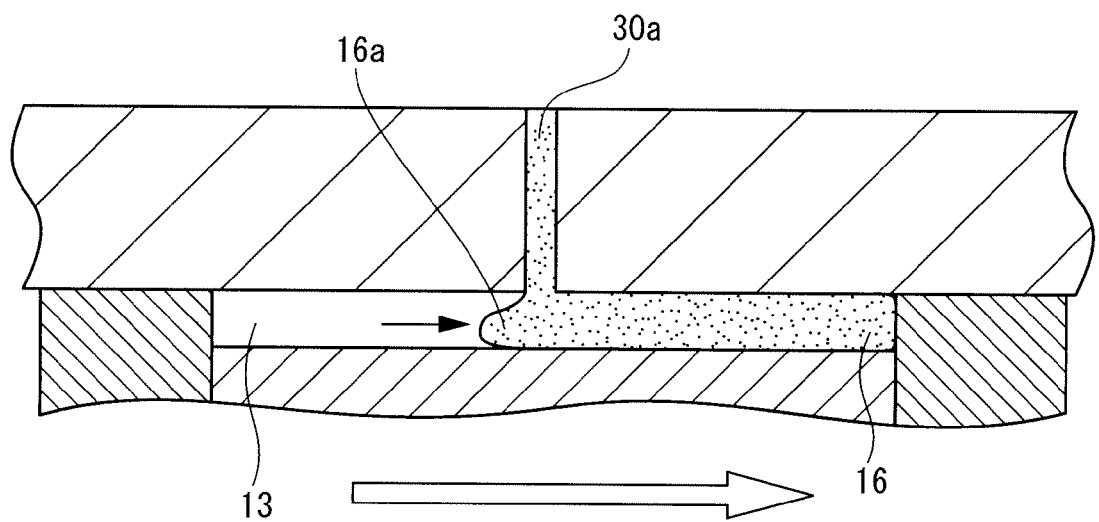
FIG. 3A is a schematic diagram showing how the thermoplastic resin composition is injected by the gate arranged at 90° in FIG. 2.

FIG. 3A is a schematic diagram showing how the thermoplastic resin composition 16 is injected by the gate 30a in FIG. 2. When the melted thermoplastic resin composition 16 is injected and filled via the gate 30a arranged to form the right angle with the moving direction of the cavity space 13, in a case with low fluidity, the filling pressure of the resin composition increases and the resin composition 16 is also injected in a direction opposite to the moving direction of the cavity space 13 as a resin composition 16a as shown by an arrow in FIG. 3A. Also, when the thermoplastic resin composition 16 is used for the fuel cell separator and formed of, for instance, a thermoplastic resin having low heat capacity (easy to cool and solidify) such as the PPS containing an electrically-conductive filler, the resin composition 16a flowing in the direction opposite to the moving direction of the cavity space 13 joints with the resin composition that is injected slightly later to form a weld mark surface on the surface of the molding. Thus, when the fine grooves are formed on the moldings, the fine grooves are broken or chipped, which causes mechanical strength of the molding to be lowered.

Note that when the thermoplastic resin or the thermoplastic resin composition with the heat-capacity not being extremely low is injected and filled, although the resin or the resin composition is also injected in the direction opposite to the moving direction of the cavity space 13, that can be re-heated and melted by heat from the melted resin being continuously introduced, so that the problem of the weld marks can be solved and a proper molding can be obtained.

Figure 3B:
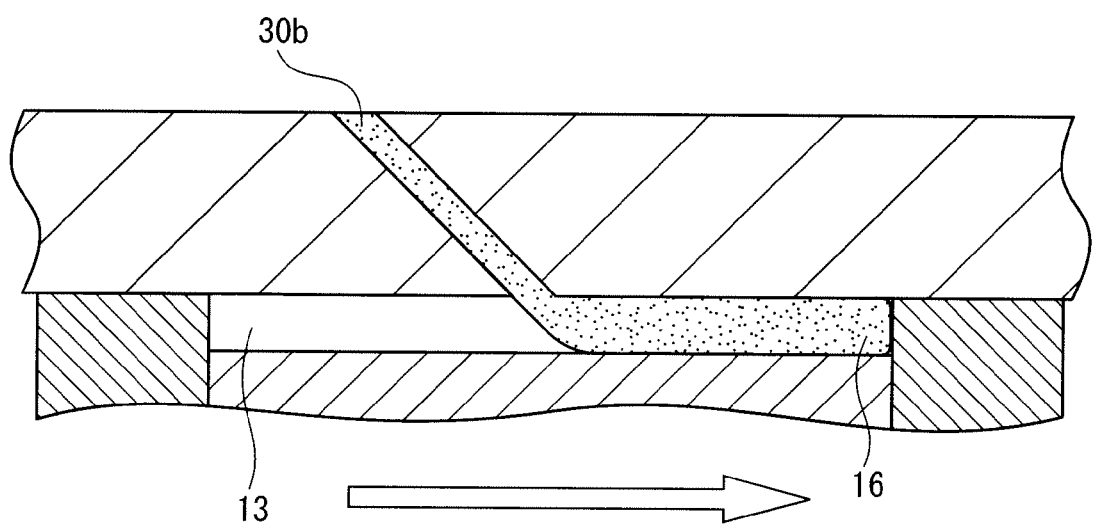
FIG. 3B is a schematic diagram showing how the thermoplastic resin composition is injected by the gate arranged at 45° in FIG. 2.

FIG. 3B is a schematic diagram showing how the thermoplastic resin composition 16 is injected with the gate 30b in FIG. 2. The melted thermoplastic resin composition 16 injected and filled via the gate 30b arranged to form the acute angle with the moving direction of the cavity space is not injected in the direction opposite to the moving direction of the cavity space 13, unlike the resin composition injected by the gate 30a shown in FIG. 3A. Thus the melted resin composition 16 becomes very easy to flow, which does not require high injection pressure and allows the thermoplastic resin composition 16 to be injected and filled efficiently.

Accordingly, as shown in FIG. 3B, the melted resin composition 16 being injected sequentially overrides the melted resin composition 16 that has been preciously injected, so that the resulted molding does not have fine weld marks on the surface. Thus, when the fuel cell separator or the like having the fine grooves is molded, the fine grooves can be prevented from being broken or chipped, thus enhancing the strength of the molding.

Although not shown, when the melted thermoplastic resin composition 16 is injected and filled by the gate 30c arranged to form the obtuse angle with the moving direction of the cavity space 13, the filling pressure of the resin increases to cause the resin composition 16a in FIG. 3A to generate significantly, which results in frequent generation of the weld marks and further degradation of the strength and the appearance of the molding.

The angle α formed by the gate 30b and the moving direction of the cavity space as shown in FIG. 2 defines an angle formed by the direction in which the thermoplastic resin composition 16 is injected and filled and the moving direction of the cavity space 13, the angle α being preferably in the range of 25° to 75°, more preferably, 40° to 60°. If the angle α is smaller than 25°, the thickness of the gate 30b becomes too thin to provide sufficient strength to the dies, while if the angle α exceeds 75°, the advantages described above cannot be attained.

Then, when the injection filling of a predetermined quantity of the thermoplastic resin composition 16 in the injection filling step is completed, at the same time with the completion of the filling, the pressure with which the dies 11, 12 are clamped is raised from the low pressure to a high pressure (e.g., 200 to 350 tons) as shown in FIG. 1C, while moving the compression block 14 forward (upward in FIG. 1C), so that the filled thermoplastic resin composition 16 is compressed and formed to obtain the molding of a predetermined shape (compression forming step).

As described above, if the resin composition is filled only by moving the cavity space 13, the fluidity of the melted thermoplastic resin composition 16 is too low to introduce the thermoplastic resin composition 16 into the fine grooves formed on the dies 11, 12, which might cause the grooves to be chipped. However, with the above arrangement, by clamping the dies 11, 12 with the high pressure just after filling the thermoplastic resin composition 16 to perform compression and forming, the melted thermoplastic resin composition 16 can reach every protruded and dented part of the grooves, resulting in obtaining the molding with excellent transcription performance of the fine grooves.

Incidentally, although the compression forming step is started simultaneously with the completion of the filling of the thermoplastic resin composition 16, which may be started after the filling is thoroughly completed or just before (e.g., 0.1 to 0.5 seconds before) the filling is completed.

In performing the molding method of the present invention, a compression speed in the compression forming step is preferably around 2 to 5 mm/sec. By setting the compression speed in such range, the injected and filled thermoplastic resin composition 16 can be preferably compressed and formed.

As for the compression pressure in the compression forming step, when an area of the cavity is 200 mm×300 mm, an average resin pressure is preferably 15 MPa or higher, more preferably, 30 to 60 MPa. A clamping pressure in such case is preferably around 200 tons, more preferably 350 tons. When the compression pressure (average resin pressure) is 15 MPa or higher, the compression forming can be performed sufficiently properly and a shrink or a warp is not generated on the appearance of the molding, thus obtaining the molding with proper appearance.

After moving the injection compression molding unit 1 forward as described above and closing and clamping the dies 11, 12 with the high pressure to compress and form the filled thermoplastic resin composition 16, the dies 11, 12 are cooled to solidify the thermoplastic resin composition 16 in the dies 11, 12. Although a cooling condition is not particularly limited, a cooling temperature may be 150 to 230° C., while a cooling time may be 20 to 80 seconds.

Then, once the thermoplastic resin composition 16 is cooled and solidified, the dies 11, 12 are opened to remove and obtain the molding.

SECOND EMBODIMENT

Figure 4A:
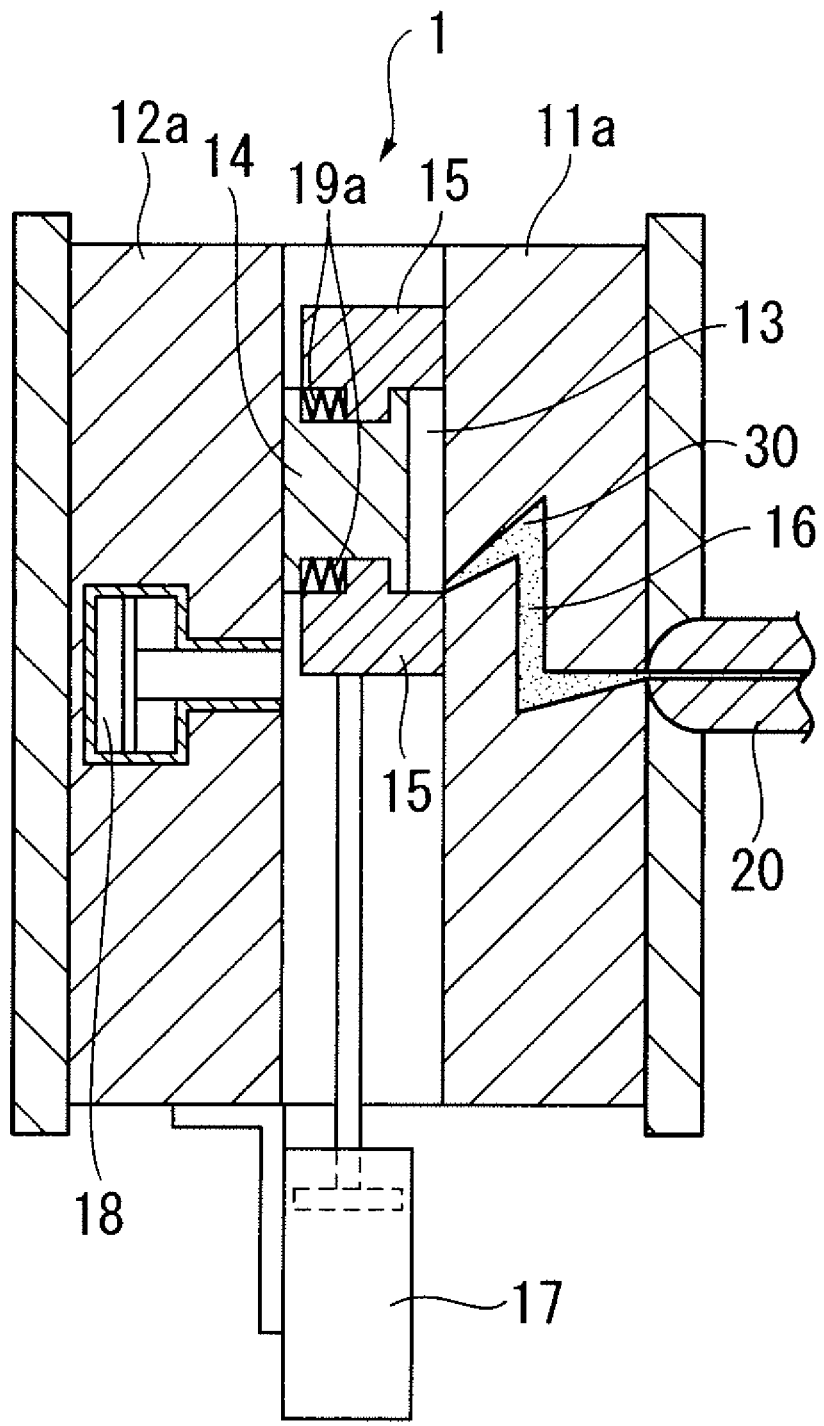
FIG. 4A is a schematic diagram showing a state in starting injection of dies having an injection compression unit according to a second embodiment of the present invention.
Figure 4B:
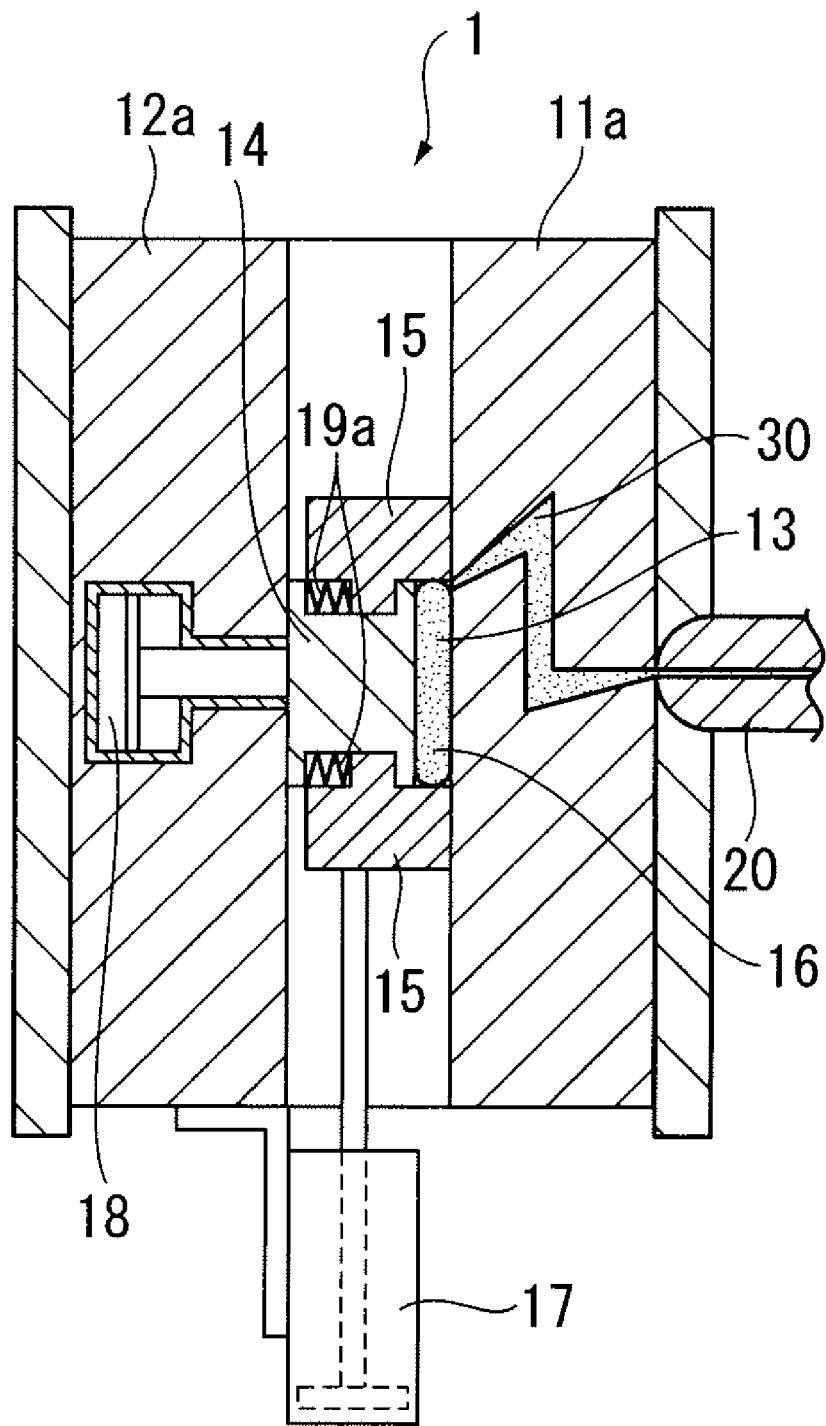
FIG. 4B is a schematic diagram showing a state during injection of the dies having the injection compression unit according to the second embodiment.
Figure 4C:
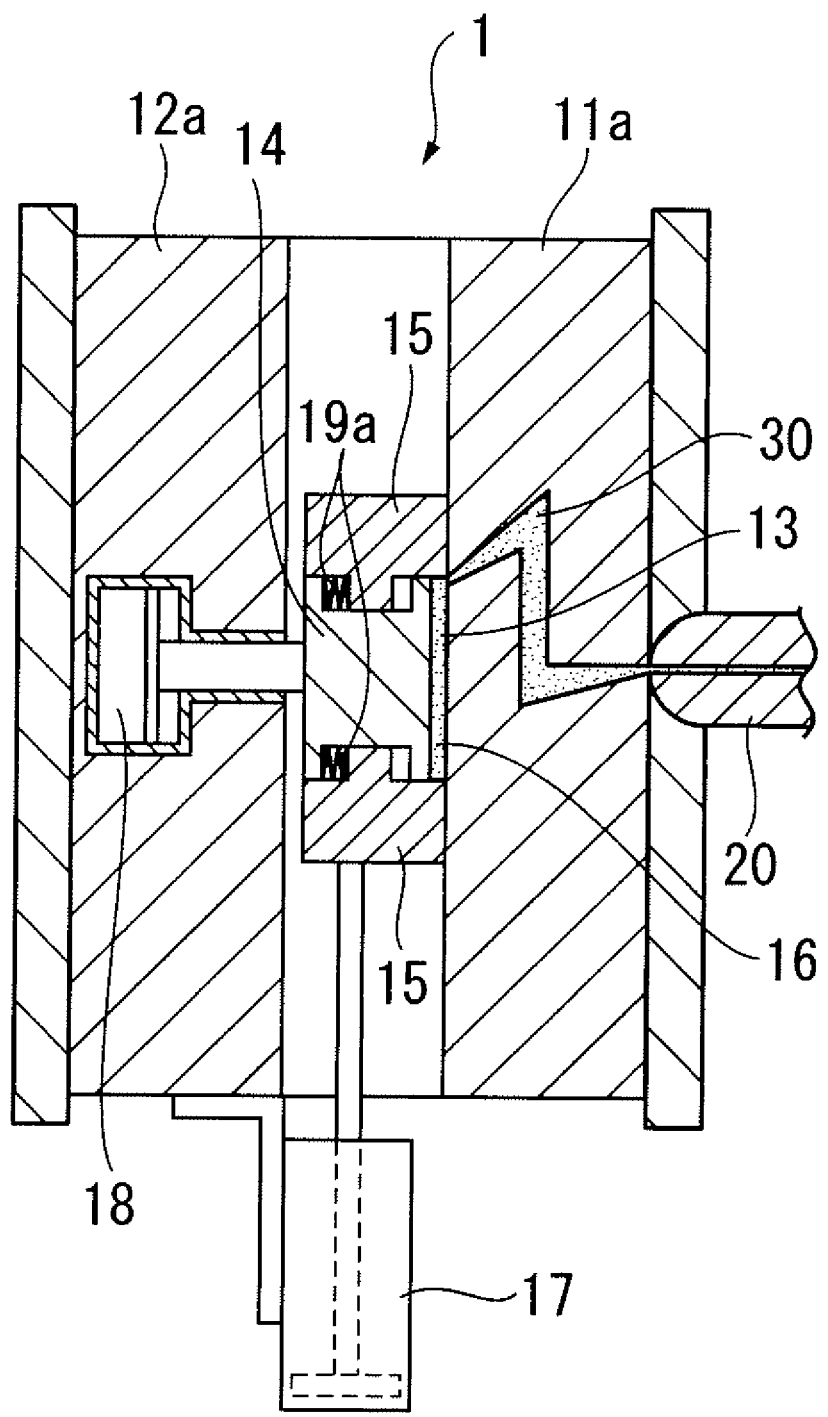
FIG. 4C is a schematic diagram showing a state during compression of the dies having the injection compression unit according to the second embodiment.

FIGS. 4A to 4C are schematic diagrams each showing an example of dies 11a, 12a having the above-described injection compression molding unit 1 in FIGS. 1A to 1C. The dies 11a, 12a shown in FIGS. 4A to 4C include a slide cylinder 17 for sliding the compression block 14 and the two cavity blocks 15 defining the cavity space 13 and a compression cylinder 18 for moving the compression block 14 forward to compress and form the thermoplastic resin composition 16 filled in the cavity space 13.

Incidentally, the dies shown in FIGS. 4A to 4C have springs 19a provided between the compression block 14 and the cavity blocks 15.

Referring to FIGS. 4A to 4C, an example of a procedures for performing the injection compression molding method of the present invention.

After the dies 11a, 12a are clamped with the low pressure of around 10 to 100 tons (per cavity area of approx. 200×300 mm; same condition in the following description), the melted thermoplastic resin composition 16 sent out from the injection unit 20 is injected from the gate 30 into the cavity space 13. Simultaneously, by driving the slide cylinder 17 to move the compression block 14 and the two cavity blocks 15, the melted thermoplastic resin composition 16 sent out from the gate 30 is filled while moving the cavity space 13 (injection filling step).

The injection filling of the thermoplastic resin composition 16 in the injection filling step is started with a tip of the gate 30 facing the lowermost part of the cavity space 13 as shown in FIG. 4A, then the gate 30 is moved as shown in FIG. 4B, and when the tip of the gate 30 faces the uppermost part of the cavity space 13 and the thermoplastic resin composition 16 is completely injected and filled in the cavity space 13, the injection filling is completed.

As described above, when the melted thermoplastic resin composition 16 is injected and filled in the cavity space 13 and the filling is completed, as shown in FIG. 4C, the dies 11a, 12a is clamped with the high pressure of around 200 to 350 tons substantially simultaneously with the completion of the filling while driving and moving the compression cylinder 18 toward the cavity space 13 to move the compression block 14 forward, thereby compressing and forming the thermoplastic resin composition 16 filled in the cavity space 13 (compression forming step).

Then, once the thermoplastic resin composition 16 in the cavity space 13 is compressed and formed, the dies 11, 12 are cooled to solidify the thermoplastic resin composition 16 in the dies 11, 12. Once the thermoplastic resin composition 16 is cooled and solidified, the dies 11, 12 are opened to remove and obtain the molding.

According to the injection compression molding method of the thermoplastic resin of the present invention performed as described above, the melted thermoplastic resin composition 16 is injected and filled while clamping the dies 11, 12 (11a, 12a) with the low pressure and moving the cavity space 13 relative to the gate 30, and then the dies 11, 12 (11a, 12a) are clamped with the high pressure to compress and form the thermoplastic resin composition filled in the cavity space 13 substantially simultaneously with the completion of the filling. With the arrangement, even when the thermoplastic resin composition 16 having low fluidity in the melted state is used, the unfilled part of the cavity space 13 is continuously formed directly below the injection port of the gate 30, thus shortening the apparent flowing length of the resin composition. Thus, the molding having uniformed density with almost no density gradient and great dimensional accuracy with small thickness distribution can be obtained, and further, even when a complex shape such as fine grooves is formed on the molding, the fine grooves can be prevented from being broken or chipped.

In addition, in the injection compression molding method of the thermoplastic resin according to the present invention, since the melted thermoplastic resin composition is filled while moving the cavity space 13, the die temperature can be set to lower as compared in the normal injection molding and the injection compression molding that do not include movement of the cavity, so that the molding cycle can be drastically shortened, thus lowering the production cost. The molding method of the present invention is also superior in moldability, thus lowering the production cost.

As described above, even when the thermoplastic resin composition 16 containing high contents of the thermally-conductive filler and having low fluidity in the melted state is used, the molding obtained by the injection compression molding method of the present invention has almost no density gradient with the thermally-conductive filler dispersed uniformly as well as having great dimensional accuracy with small thickness distribution, and further, even when the complex shape such as the one having fine grooves is formed on the molding, the fine grooves can be prevented from being broken or chipped.

Since the molding can be molded into a desired shape, the molding can be widely applied in molding the fuel cell separator (especially, a polymer electrolyte fuel cell separator) using the electrically-conductive filler as the thermally-conductive filler, in molding the flat antenna using the highly-dielectric filler as the thermally-conductive filler, in molding the radiator plate using the metal filler as the thermally-conductive filler, and the like.

Specifically, the fuel cell separator containing high contents of the black graphite with high electrical conductivity, the radiator plate containing the high content of metal powder with high thermal conductivity to have high thermal conductivity, and the flat antenna containing the high content of highly-dielectric filler with high frequency property can be exemplified. Although the thermoplastic resin composition containing the high content of those fillers show significantly low fluidity due to heat release in the injection filling step, the molding method of the present invention allows these fillers to be dispersed uniformly, the moldings with high product performance can be provided.

Figure 5:
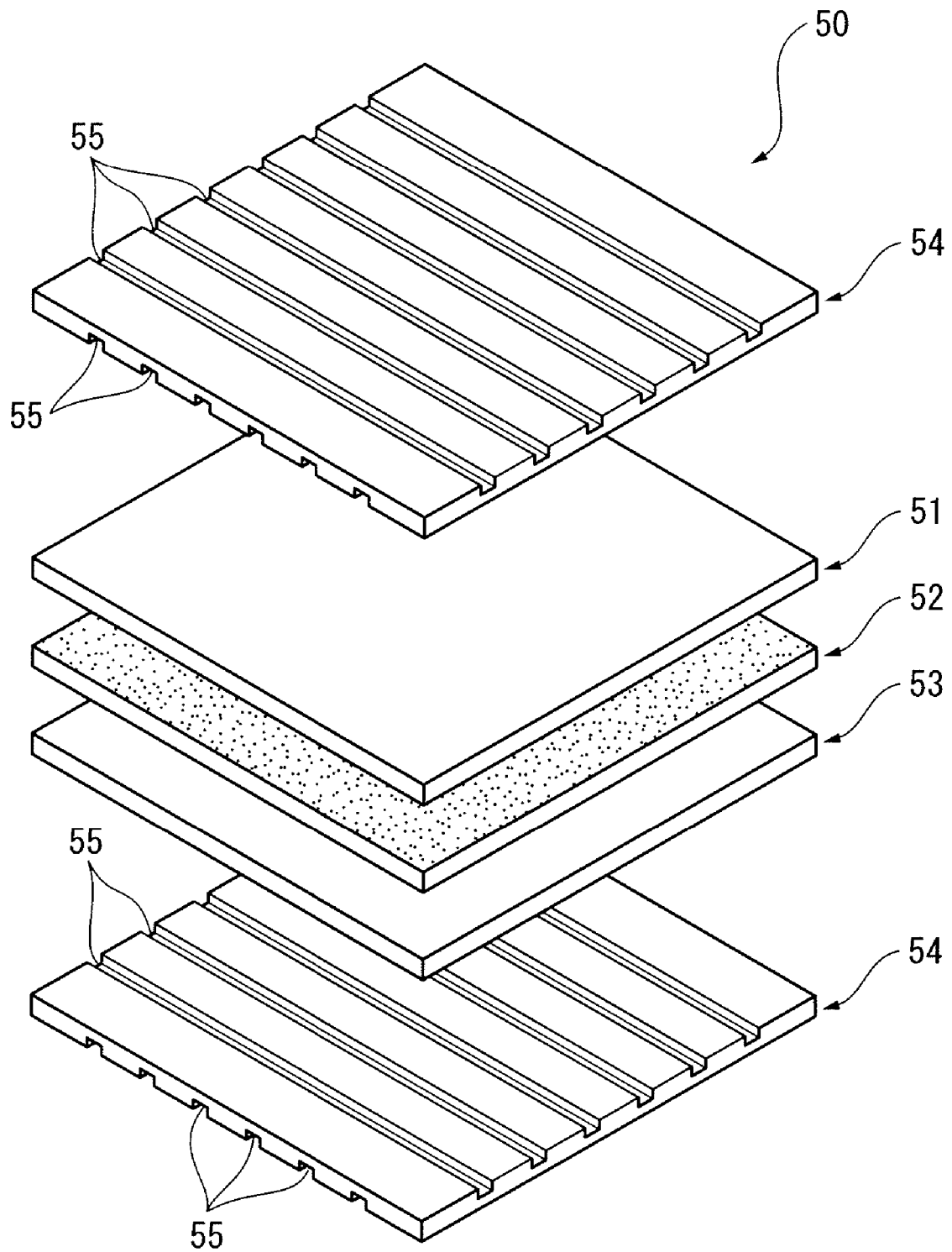
FIG. 5 is an outline showing an arrangement of a fuel cell using a fuel cell separator that is molded by an injection compression molding method of the present invention.

FIG. 5 is an outline showing a basic arrangement of a fuel cell 50 using the fuel cell separator that is formed by the molding obtained by the injection compression molding method of the present invention and employs the electrically-conductive filler as the thermally-conductive filler.

The fuel cell 50 shown in FIG. 5 includes a fuel electrode 51, an electrolyte plate 52, an oxidized pole plate 53 and a fuel cell separator 54 (hereinafter, simply referred to as "separator 54" in some cases), and a plurality of grooves 55 are formed respectively on both front and back sides of the separator 54.

The plurality of grooves 55 formed on the fuel cell separator 54 (grooves with 2 mm in width, 0.5 mm in depth and 200 mm in length) are preferably formed at one time by transcribing using the injection compression molding method of the present invention, so that machining such as cutting is not necessary, enabling the separator 54 to be obtained with low cost.

Note that the separator 54 might not be formed in a predetermined shape only by a single injection compression molding using the dies, depending on the shape, so that machining such as cutting, drilling and threading can be provided to the obtained molding as additional processes.

Incidentally, the above description shows an example of the present invention, and the present invention is not limited to the above described embodiments but includes modifications and variations as long as the objects and the advantages of the present invention can be achieved. Further, specific structure and shape of the components in implementing the present invention may be designed in any manner as long as the objects of the present invention can be achieved

THIRD EMBODIMENT

For instance, in the above described embodiments, the dies 11a, 12a shown in FIGS. 4A to 4C include the compression cylinder 18, and by moving the compression block 14 using the compression cylinder 18 toward the cavity space 13, the thermoplastic resin composition 16 filled in the cavity space 13 is compressed and formed. However, in dies 11b, 12b shown in FIGS. 6A to 6C the die 12b may be moved toward the cavity space 13 to compress and form the thermoplastic resin composition 16 filled in the cavity space 13.

Incidentally, in the following description, the same reference numeral will be attached to the same components as the above to omit the description thereof.

Figure 6A:
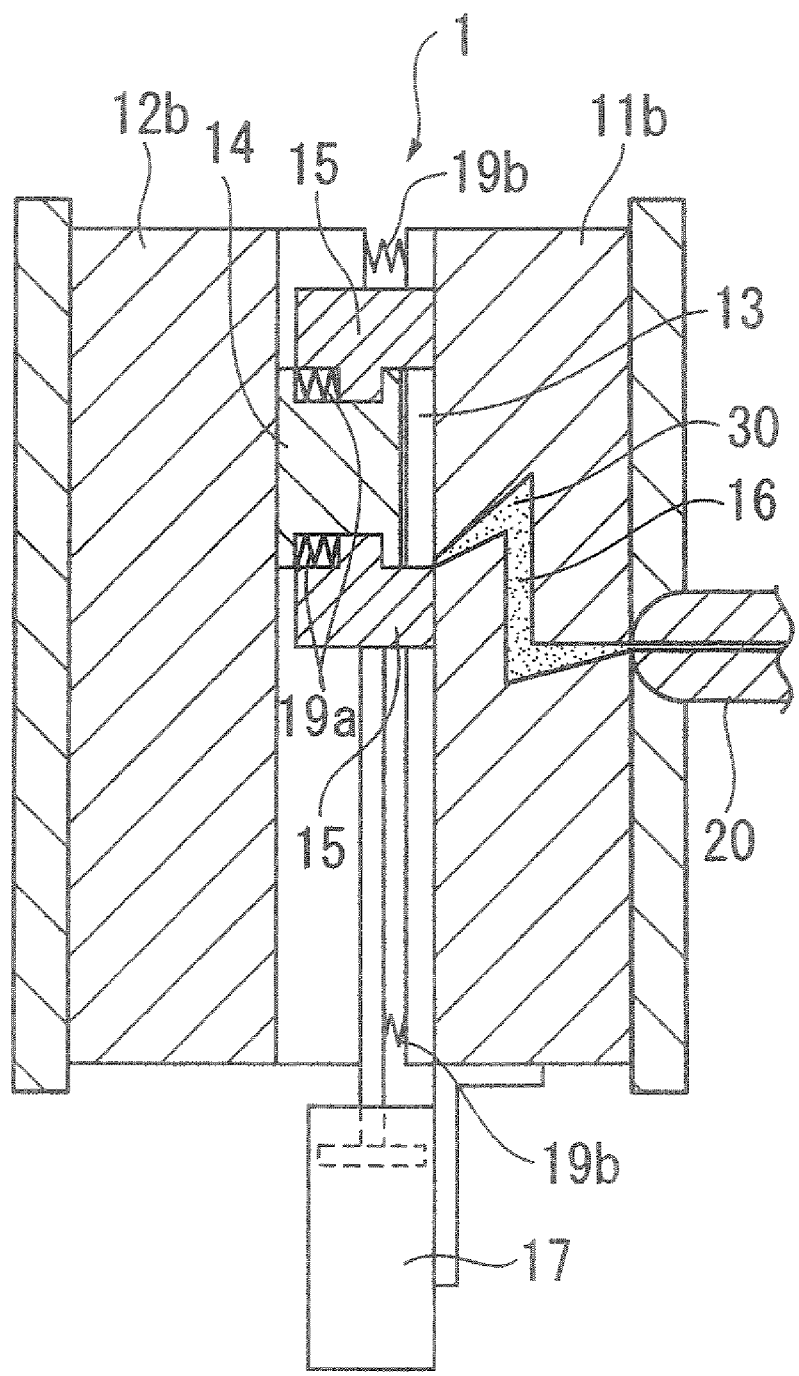
FIG. 6A is a schematic diagram showing a state in starting injection of dies having an injection compression unit performing an injection compression molding method of a third embodiment of the present invention.
Figure 6B:
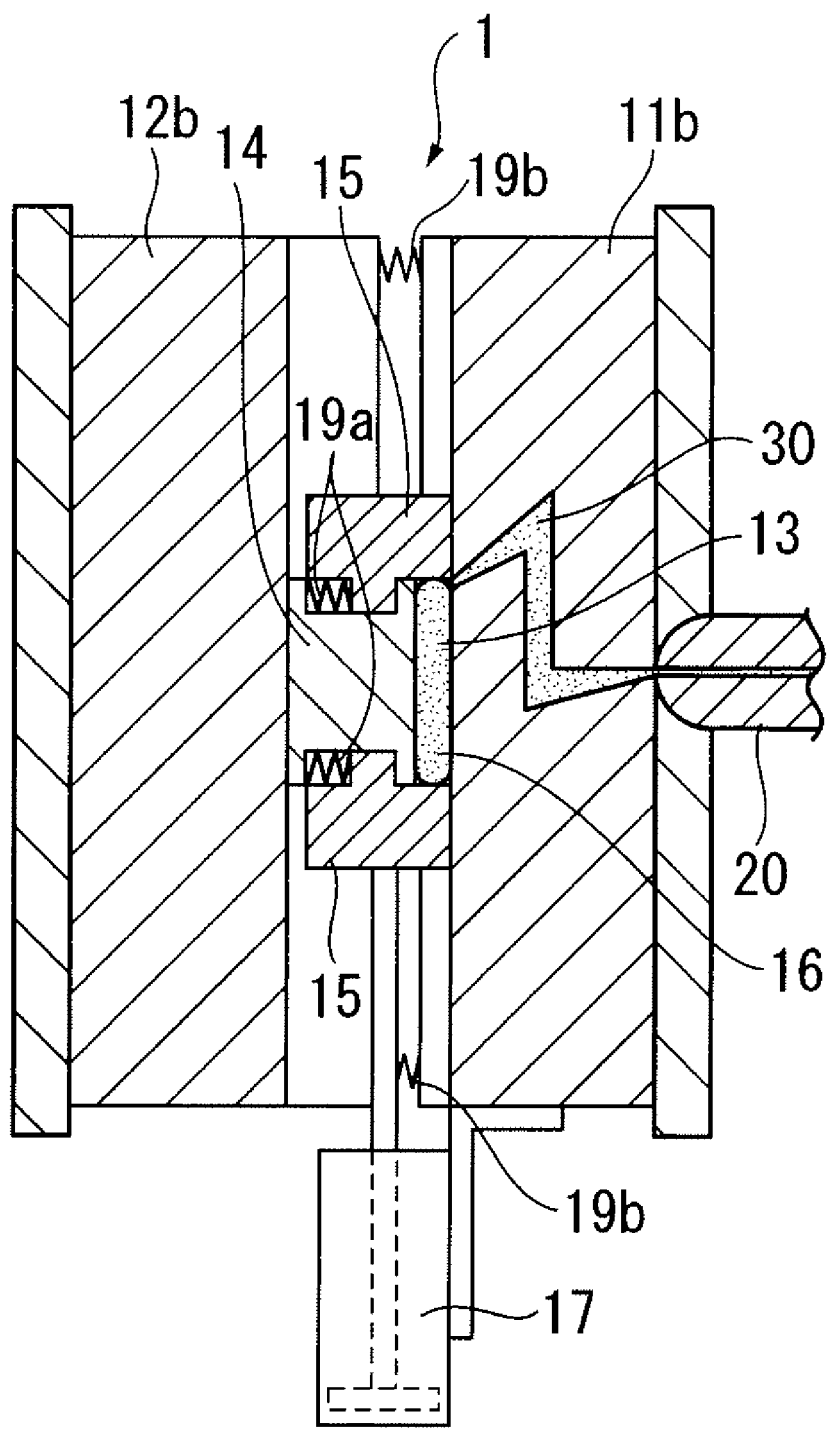
FIG. 6B is a schematic diagram showing a state during injection of the dies having the injection compression unit according to the third embodiment.
Figure 6C:
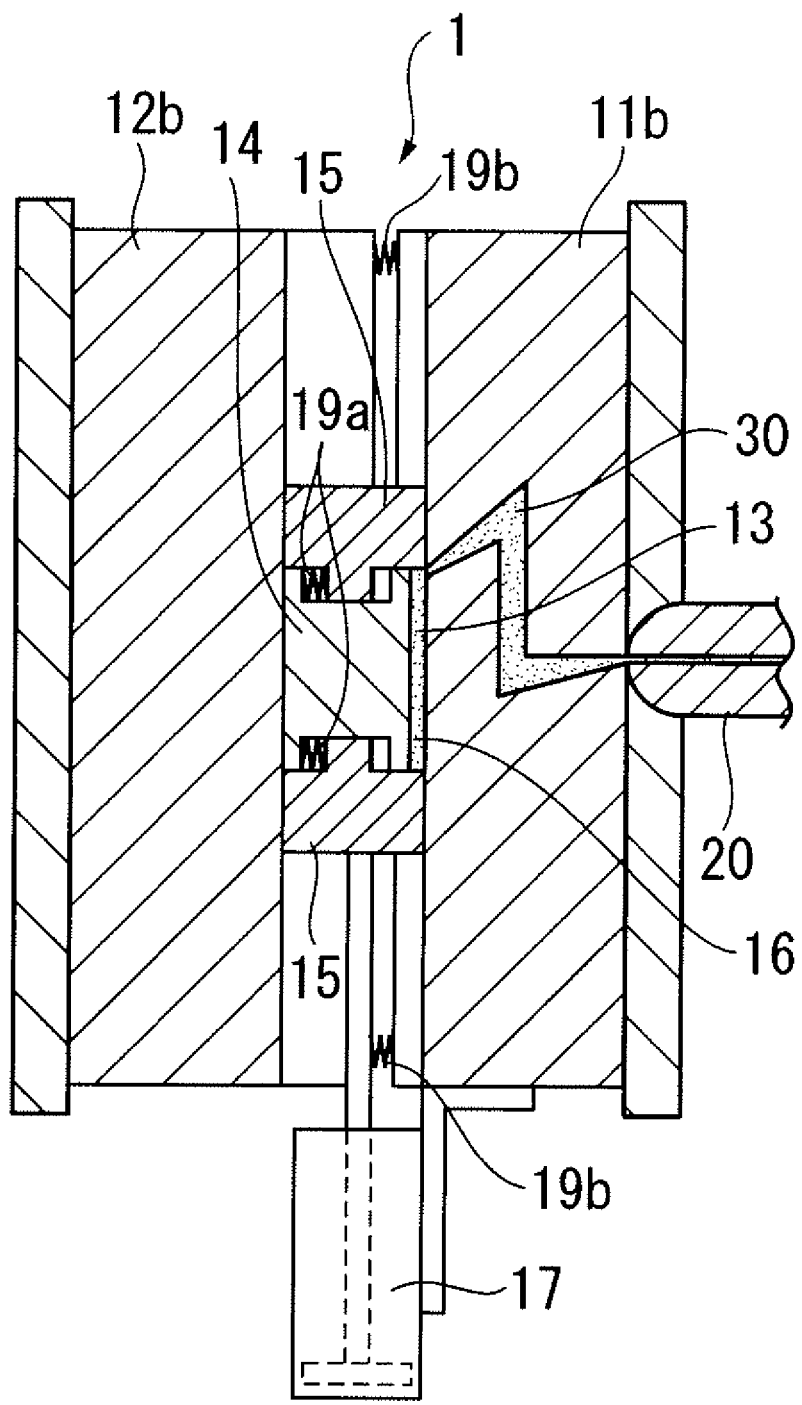
FIG. 6C is a schematic diagram showing a state during compression of the dies having the injection compression unit according to the third embodiment.

FIGS. 6A to 6C are schematic diagrams each showing another example of dies having the injection compression molding unit 1 in FIGS. 1A to 1C. The dies 11b, 12b shown in FIGS. 6A to 6C are similar to the dies in FIGS. 4A to 4C in that the slide cylinder 17 for moving the compression block 14 and the two cavity blocks 15 defining the cavity space 13 is provided, but different from the dies in FIGS. 4A to 4C in that the die 12b is moved toward the cavity space 13 as a means for compressing and forming the thermoplastic resin composition 16 filled in the cavity space 13.

Incidentally, the dies 11b, 12b shown in FIGS. 6A to 6C have springs 19b provided between the dies 11b, 12b, in addition to the springs 19a provided between the compression block 14 and the cavity blocks 15.

The dies 11b, 12b shown in FIGS. 6A to 6C are clamped with the low pressure of around 10 to 100 tons, as with the dies 11a, 12a shown in FIGS. 4A to 4C, the melted thermoplastic resin composition 16 sent out by the injection unit 20 is injected and filled into the cavity space 13 from the gate 30 while actuating the slide cylinder 17 to move the cavity space 13 defined by the compression block 14 and the two cavity blocks 15 relative to the gate 30.

Next, by clamping the dies 11b, 12b with the high pressure of around 200 to 350 tons and moving the dies 11b, 12b toward the cavity space 13 with substantially simultaneously with the completion of the filling of the thermoplastic resin composition 16, the thermoplastic resin composition 16 filled in the cavity space 13 is compressed and formed (compression forming step).

The following operations are the same as with the dies shown in FIGS. 4A to 4C; once the thermoplastic resin composition 16 is compressed and formed, the dies 11, 12 are cooled to solidify the thermoplastic resin composition 16 in the dies 11, 12, and once the thermoplastic resin composition 16 is cooled and solidified, the dies 11, 12 are opened to remove and obtain the molding.

FOURTH EMBODIMENT

Figure 8A:
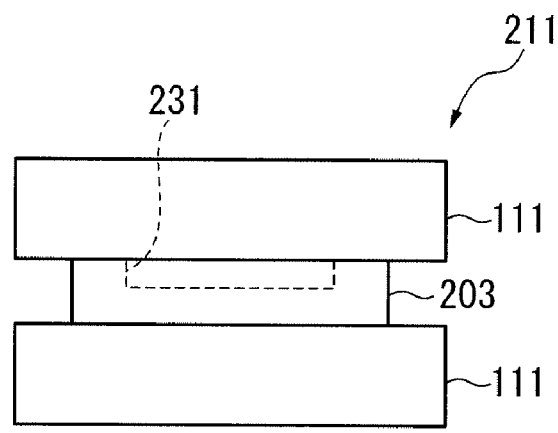
FIG. 8A is an illustration showing a manufacturing step of a molding according to the fourth embodiment.
Figure 8B:
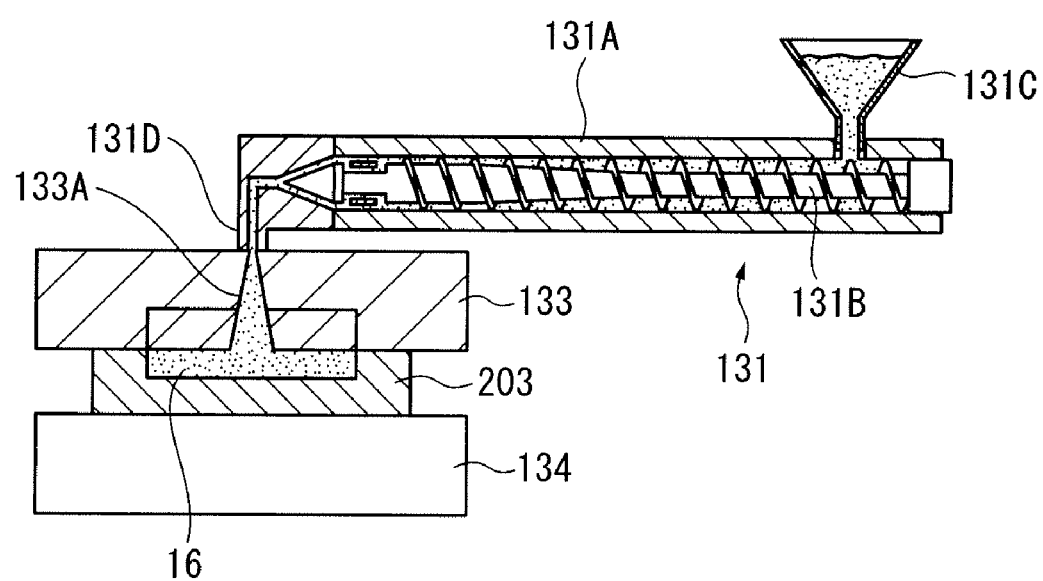
FIG. 8B is an illustration showing another manufacturing step of the molding according to the fourth embodiment.
Figure 8C:
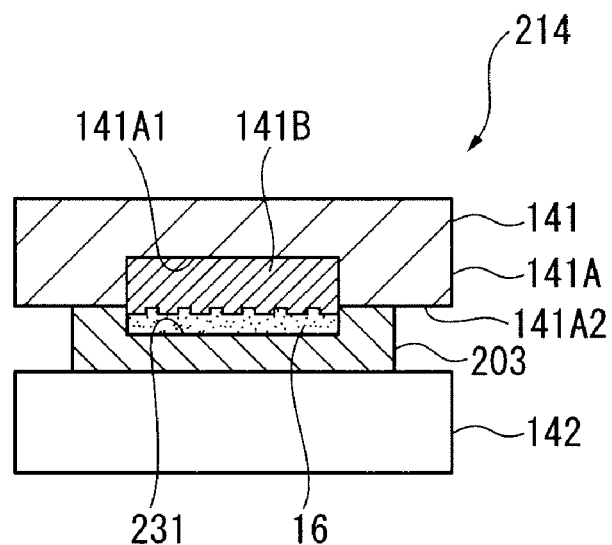
FIG. 8C is an illustration showing still another manufacturing step of the molding according to the fourth embodiment.
Figure 8D:
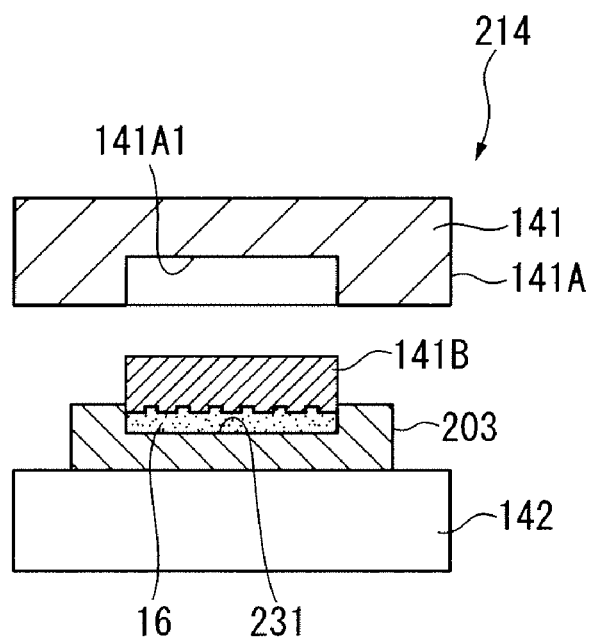
FIG. 8D is an illustration showing yet another manufacturing step of the molding according to the fourth embodiment.
Figure 8E:
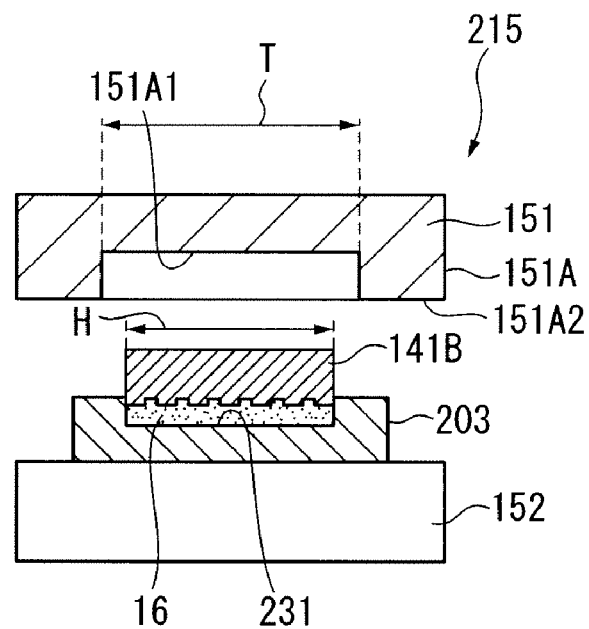
FIG. 8E is an illustration showing further manufacturing step of the molding according to the fourth embodiment.
Figure 8F:
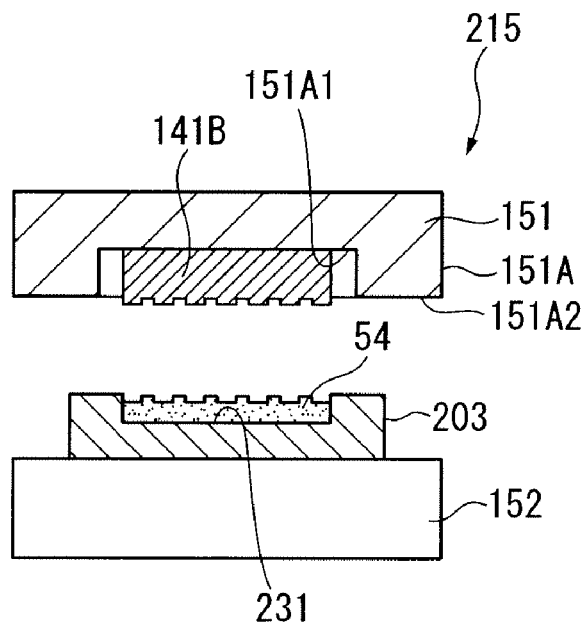
FIG. 8F is an illustration showing still further manufacturing step of the molding according to the fourth embodiment.

In FIG. 7, a manufacturing machine 201 of the present embodiment performs injection compression molding of the thermoplastic resin composition 16 (refer to FIG. 8B) as a material containing the thermoplastic resin and the thermally-conductive filler having electrical conductivity in accordance with the present invention to manufacture the fuel cell separator 54 as the molding (refer to FIGS. 8F and 5).

The manufacturing machine 201 includes a heating device 211, a filling device 213, a compressing device 214, a cooling device 215 and a carrying device 216. The heating device 211, the filling device 213, the compressing device 214 and the cooling device 215 are arranged substantially on a single circle (each of the devices 211, 213, 214 and 215 are arranged on a circle R in FIG. 7).

As shown in FIG. 8A, the heating device 211 heats a molding die 203. The molding die 203 has a substantially rectangular shape in plan view with a rectangular dent that opens upward being formed at a planar center. The dent serves as a cavity space 231. Although not shown, a bottom side of the dent is provided with a plurality of grooves arranged in parallel to each other.

Note that the molding die 203 constitutes the dies together with later-described molding dies of the filling device 213, the compressing device 214 and the cooling device 215.

The heating device 211 includes a heater block 111 for sandwiching and heating the molding die 203. The heater block 111 heats the molding die 203 to the temperature equal to or higher than melting point of a thermoplastic resin contained in the thermoplastic resin composition 16, e.g., approx. 300° C.

Figure 9:
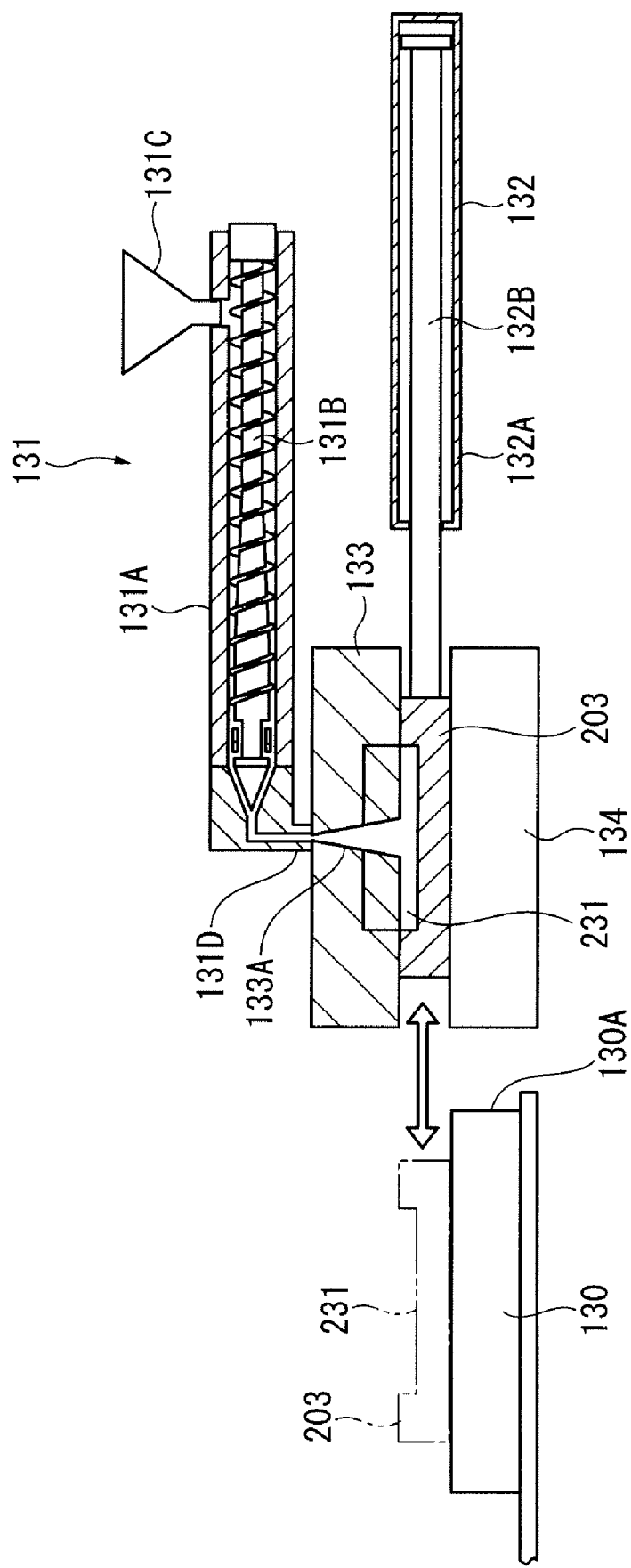
FIG. 9 is a schematic diagram showing a filling device of a manufacturing machine according to the fourth embodiment of the present invention.

As shown in FIGS. 7, 8B and 9, the filling device 213 includes a transferring device 130, an extruding device 131, a molding die 133, a table 134 and a moving device 132.

Note that the molding die 133 and the extruding device 131 are not shown in FIG. 7.

The transferring device 130 receives the molding die 203 heated by the heating device 211 from the carrying device 216 and transfers the molding die 203 to the table 134. The transferring device 130 includes a mount table 130A on which the molding die 203 is mounted and a carrying section (not shown) for carrying the molding die 203 on the mount table 130A to the table 134.

As shown in FIGS. 8B and 9, the extruding device 131 plasticizes and extrudes the introduced thermoplastic resin composition 16 into the molding die 203, the extruding device 131 including a cylinder 131A having a heater (not shown) utilizing a heat transfer medium, a screw 131B disposed in the cylinder 131A, a hopper 131C for introducing the thermoplastic resin composition 16 into the cylinder 131A, an oil pressure power unit for rotating the screw 131B, and a nozzle 131D for connecting the cylinder 131A and the molding die 133.

In the extruding device 131, the thermoplastic resin composition 16 introduced from the hopper 131C is heated by the heater of the cylinder 131A, moved by the screw 131B rotated by the oil pressure power unit toward the nozzle 131D at a tip of the cylinder 131A while being plasticized, and extruded via the nozzle 131D into a cavity space 231 in the molding die 203.

The cylinder 131A is heated to, for instance, 380° C. by the heater.

The table 134 supports the molding die 203 when the thermoplastic resin composition 16 is filled in the molding die 203.

The molding die 133 is disposed opposite to the cavity space 231 of the molding die 203, the molding die 133 having a gate 133A formed therein. The gate 133A is connected to the above-described nozzle 131D, through which the thermoplastic resin composition 16 is filled in the cavity space 231 of the molding die 203. The molding dies 133 and 203 constitute a pair of the dies.

The table 134 and the molding die 133 are heated by the heater block, and the molding die 203 is heated to the temperature equal to or higher than the melting point of the thermoplastic rein contained in the thermoplastic resin composition 16.

The moving device 132 moves the molding die 203 mounted on the table 134 relative to the gate 133A In other words, the cavity space 231 of the molding die 203 is moved by the moving device 132 relative to the gate 133A.

The moving device 132, is for instance, an oil pressure cylinder, which includes a cylindrical cylinder body 132A and an axial piston 132B that slides in the cylinder body 132A.

A tip of the piston 132B is so arranged that the molding die 203 can be fixed thereto.

As shown in FIGS. 7, 8C and 8D, the compressing device 214 compresses and forms the thermoplastic resin composition 16 filled in the molding die 203 by the filling device 213.

The compressing device 214 includes a movable molding die 141 and a table 142, which mounts the molding die 203 on the table 142 while compression and forming the thermoplastic resin composition 16 in the molding die 203 with the molding die 141 disposed opposite to the molding die 203. The molding dies 141 and 203 constitute a pair of the dies.

The molding die 141 includes a molding die body 141A and a compression nested block 141B.

A dent 141A1 is formed on a surface 141A2 of the molding die body 141A on the table 142 side, and the compression nested block 141B is inserted into the dent 141A1.

The compression nested block 141B has a rectangular shape in plan view corresponding to the dent of the molding die 203, on which a plurality of grooves are formed on a surface on the table 142 side. Shapes of the grooves are arbitrary, so that linear grooves may be arranged in parallel to each other or in orthogonal to each other.

When the compression nested block 141B is inserted into the dent 141A1 of the molding die body 141A, the surface having the grooves of the compression nested block 141B projects from the surface 141A2 of the molding die body 141A toward the table 142. In other words, the thickness of the compression nested block 141B is larger than the depth of the dent 141A1 of the molding die body 141A.

As shown in FIG. 8D, the compression nested block 141B is removable from the dent 141A1 of the molding die body 141A.

The plurality of grooves on the compression nested block 141B are transcribed on the thermoplastic resin composition 16 when the thermoplastic resin composition 16 filled in the molding die 203 is compressed and formed.

The compressing device 214 includes a heater (not shown) which adjust the temperature of the molding die 203 to be equal to or lower than the crystallization temperature of the thermoplastic resin contained in the thermoplastic resin composition 16, after compression forming is started. For instance, the molding die 203 is adjusted to be 230° C. after the compression forming is started.

As shown in FIGS. 7, 8E and 8F, the cooling device 215 cools and solidifies the thermoplastic resin composition 16 compressed and formed by the compressing device 214 to remove the thermoplastic resin composition 16 as the separator 54. The molding die 203 is cooled to the temperature equal to or lower than the crystallization temperature of the thermoplastic resin contained in the thermoplastic resin composition 16, e.g., 180° C.

The cooling device 215 includes a movable molding die 151 and a table 152, in which the molding die 151 and the table 152 sandwich and cool the molding die 203. The molding die 151 includes a molding die body 151A and the above-described compression nested block 141B. A dent 151A1 is formed on a surface 151A2 of the molding die body 151A on the table 152 side, to which the above-described compression nested block 141B is inserted.

When the compression nested block 141B is inserted into the dent 151A1, the surface having the grooves of the compression nested block 141B projects from the surface 151A2 of the molding die body 151A toward the table 152. In other words, the thickness of the compression nested block 141B is larger than the depth of the dent 151A1 of the molding die body 151A.

The dent 151A1 of the molding die body 151A has a substantially rectangular shape in plan view, the planar shape of which is larger than that of the compression nested block 141B. For instance, the width T of the dent 151A1 in FIG. 8E is larger than the width H of the compression nested block 141B.

The molding dies 151 and 203 constitute a pair of the dies.

When the separator 54 is removed after cooling the thermoplastic resin composition 16 in the molding die 203 with the cooling device 215, the molding die body 151A and the compression nested block 141B are integrally moved away from the molding die 203, as shown in FIG. 8F.

The carrying device 216 carries the molding die 203 to the heating device 211, the filling device 213, the compressing device 214 and the cooling device 215. An arrangement of the carrying device 216 is arbitrary as long as it carries the molding die 203 to the heating device 211, the filling device 213, the compressing device 214 and the cooling device 215, which, for instance may include a movable table on which the molding die 203 is mounted and rails to move the movable table, or may sandwich lateral sides of the molding die 203 in carrying the molding die 203.

The carrying device 216 moves in directions shown by arrows Y in FIG. 7 to carry the molding die 203 to the heating device 211, the filling device 213, the compressing device 214 and the cooling device 215.

The separator 54 is manufactured as described below using the manufacturing machine 201 described above.

First, as shown in FIG. 8A, the molding die 203 is heated by the heating device 211 (heating step).

When the molding die 203 is heated to a predetermined temperature (e.g., 300° C.), the molding die 203 is carried to the mount table 130A of the transferring device 130 of the filling device 213 by the carrying device 216. The molding die 203 is then mounted on the table 134 by the carrying section of the transferring device 130. Then, as shown in FIG. 8B, the melted thermoplastic resin composition 16 is filled in the cavity space 231 of the molding die 203 by the extruding device 131 (filling step).

At this time, the temperature of the molding die 203 is equal to or higher than the melting point of the thermoplastic resin composition 16 as the material (e.g., 300° C.).

When the thermoplastic resin composition 16 is filled in the cavity space 231 of the molding die 203, the moving device 132 is actuated to slide the piston 132B in the cylinder body 132A, so that the cavity space 231 of the molding die 203 is moved relative to the gate 133A.

Incidentally, during the filling, another molding die 203 is set in the heating device 211 to be heated.

Next, the molding die 203 filled with the thermoplastic resin composition 16 is carried by the carrying section of the transferring device 130, and again mounted on the mount table 130A of the transferring device 130.

Then, the molding die 203 is carried to the compressing device 214 by the carrying device 216.

As shown in FIG. 8C, in the compressing device 214, the molding die 203 is set on the table 142, and the molding die 141 is moved down with the molding die body 141A and the compression nested block 141B being integrated to compress and form the thermoplastic resin composition 16 in the cavity space 231 of the molding die 203 (compression forming step). Then, after starting compression forming, the temperature of the molding die 203 is adjusted to be equal to or lower than the crystallization temperature of the thermoplastic resin contained in the thermoplastic resin composition 16. For instance, the molding die is adjusted to be 230° C.

Here, by starting the compression forming before the temperature of the molding die 203 becomes equal to or lower than the crystallization temperature of the thermoplastic resin contained in the thermoplastic resin composition 16, the compression nested block 141B can be pressed to the thermoplastic resin composition 16 in the melted state, so that the melted thermoplastic resin composition 16 can be introduced into the grooves on the compression nested block 141B. In the compressing device 214, as described above, the temperature of the molding die 203 can be kept equal to or lower than the crystallization temperature with the thermoplastic resin composition 16 introduced in the grooves on the compression nested block 141B.

Incidentally, when heating of the another molding die 203 by the heating device 211 is completed while the compression forming step is performed by the compressing device 214, the another molding die 203 is carried to the filling device 213 by the carrying device 216 to perform the filling step.

After completing the compression forming step, the molding device body 141A of the molding device 141 is moved upward and away from the molding die 203. At this time, as shown in FIG. 8D, the molding die body 141A and the compression nested block 141B are separated, the compression nested block 141B staying on the thermoplastic resin composition 16 in the molding die 203.

Next, the molding die 203 and the compression nested block 141B on the molding die 203 are carried to the cooling device 215 by the carrying device 216. In the cooling device 215, the molding die 203 and the compression nested block 141B are set on the table 152. Then, the molding die body 151A is moved down to the table 152, and the compression nested block 141B is inserted into the dent 151A1 of the molding die body 151A as shown in FIG. 8E. Thereby, the molding die 203 is cooled, so that the thermoplastic resin composition 16 in the molding die 203 is solidified (cooling step). Consequently, manufacturing of the separator 54 is completed.

When the separator 54 is removed, as shown in FIG. 8F, the molding die body 151A and the compression nested block 141B are integrally moved upward and away from the molding die 203. The separator 54 can thus be removed from the molding die 203.

Incidentally, the molding die 203 from which the separator 54 is removed is again carried to the heating device 211 to be heated.

According to the present embodiment, the following advantages can be attained.

(1) In the filling step, since the thermoplastic resin composition 16 is filled in the cavity space 231 while moving the cavity space 231 relative to the gate 133A, even when the thermoplastic resin composition 16 with low fluidity is used, the thermoplastic resin composition 16 can be spread in the cavity space 231 uniformly. For instance, if the thermoplastic resin composition 16 that contains the high content of thermally-conductive filler having an electrical conductivity and has low fluidity is used as the one used in the separator 54, the thermoplastic resin composition 16 can be spread in the cavity space 231 uniformly. With the arrangement, the uniformity of the thickness of the separator 54 can be secured.

(2) Since the thermoplastic resin composition 16 is filled while moving the cavity space 231 relative to the gate 133A in the filling step, the apparent flowing length of the thermoplastic resin composition 16 is shortened, so that high filling pressure becomes unnecessary in filling the thermoplastic resin composition 16. Thus, in a case where, for instance, the fuel cell separator 54 is molded, formation of a skin causing increase of electrical resistance can be prevented.

(3) Further, since the thermoplastic resin composition 16 is filled while moving the cavity space 231 in the filling step, the uniformity of the thickness of the separator 54 can be secured, so that, unlike the related arts, the rapid heating/cooling of the dies is not required, thus greatly shortening the molding cycle.

Still further, since the thermoplastic resin composition 16 is filled while moving the cavity space 231 in the filling step, generation of the weld marks can be prevented, thus enhancing the strength of the separator 54.

(4) According to the present embodiment, the molding is manufactured using the manufacturing machine 201 including the heating device 211, the filling device 213, the compressing device 214, the cooling device 215 and the carrying device 216 for carrying the molding die 203 to each of the above-described devices 211, 213, 214 and 215, the heating device 211, the filling device 213, the compressing device 214 and the cooling device 215 being arranged substantially on a single circle.

Since the molding die 203 can be carried to the filling device 213 by the carrying device 216 after heating the molding die 203 with the heating device 211, another molding die 203 can be heated while the current one is filled by the filling device 213. With the arrangement, the separator 54 can be manufactured continuously, so that productivity of the separator 54 can be enhanced.

(5) Since the manufacturing machine 201 used in the present embodiment includes the heating device 211, the filling device 213, the compressing device 214 and the cooling device 215 arranged substantially on the single circle, it saves spaces as compared to the one including the respective devices 211 to 215 arranged linearly.

(6) Since the temperature of the molding die 203 is set to be equal to or higher than the melting point of the thermoplastic resin in the filling step, the fluidity of the thermoplastic resin contained in the thermoplastic resin composition 16 to be filled in the cavity space 231 in the filling step can be enhanced. With the arrangement, the thermoplastic resin composition 16 can be spread more uniformly in the cavity space.

Further, by starting the compression forming before the temperature of the molding die 203 becomes equal to or lower than the crystallization temperature of the thermoplastic resin in the compression forming step, the compression nested block 141B can be pressed to the thermoplastic resin composition 16 while the thermoplastic resin contained in the thermoplastic resin composition 16 is in the melted state, so that the melted thermoplastic resin composition 16 can be introduced into the grooves on the compression nested block 141B. In the compressing device 214, since the temperature of the molding die 203 is set to equal to or lower than the crystallization temperature with the thermoplastic resin composition 16 being introduced into the grooves of the compression nested block 141B, the grooves formed on the compression nested block 141B are securely transcribed to the thermoplastic resin composition 16 in the cavity space 231.

(7) In the present embodiment, the molding die 203 is carried to the respective devices 211, 213, 214 and 215 of the manufacturing machine 201.

Thus, when the compressing device 214 has a plurality of compression nested block 141B with a plurality of grooves having different shapes respectively, a molding having grooves with different shapes can be manufactured by replacing the compression nested blocks 141B. In other words, plural types of moldings can be manufactured in a manufacturing line.

(8) In the present embodiment, that of the dent 151A1 of the molding body 151A of the cooling device 215 is larger than the planer shape of the compression nested block 141B. The planar shape of the dent 151A1 of the molding body 151A is arranged to be larger than that of the compression nested block 141B so that a horizontal loading (shearing force) does not act on the compression nested block 141B when the compression nested block 141B is moved down and inserted into the dent 151A1.

For instance, in inserting the compression nested block 141B into the dent 151A1 of the molding die body 151A, if the compression nested block 141B collides with the dent 151A1 of the molding die body 151A to cause the compression nested block 141B to be displaced, the displacement of the compression nested block 141B might cause the grooves of the moldings to be broken.

In the present embodiment, since the planar shape of the dent 151A1 of the molding body 151A is larger than that of the compression nested block 141B, it is possible to prevent the dent 151A1 of the molding body 151A from colliding with the compression nested block 141B, thus preventing the grooves or the like of the separator 54 being broken.

Incidentally, the present invention is not limited to the above-described present embodiments, but includes modifications and improvements as long as the objects of the present invention can be achieved.

For instance, although the number of each of the heating device 211, the filling device 213, the compressing device 214 and the cooling device 215 of the manufacturing machine 201 is only one in the above-described embodiment, the number of the compressing device 214 and the cooling device 215 may be two or more.

Figure 10:
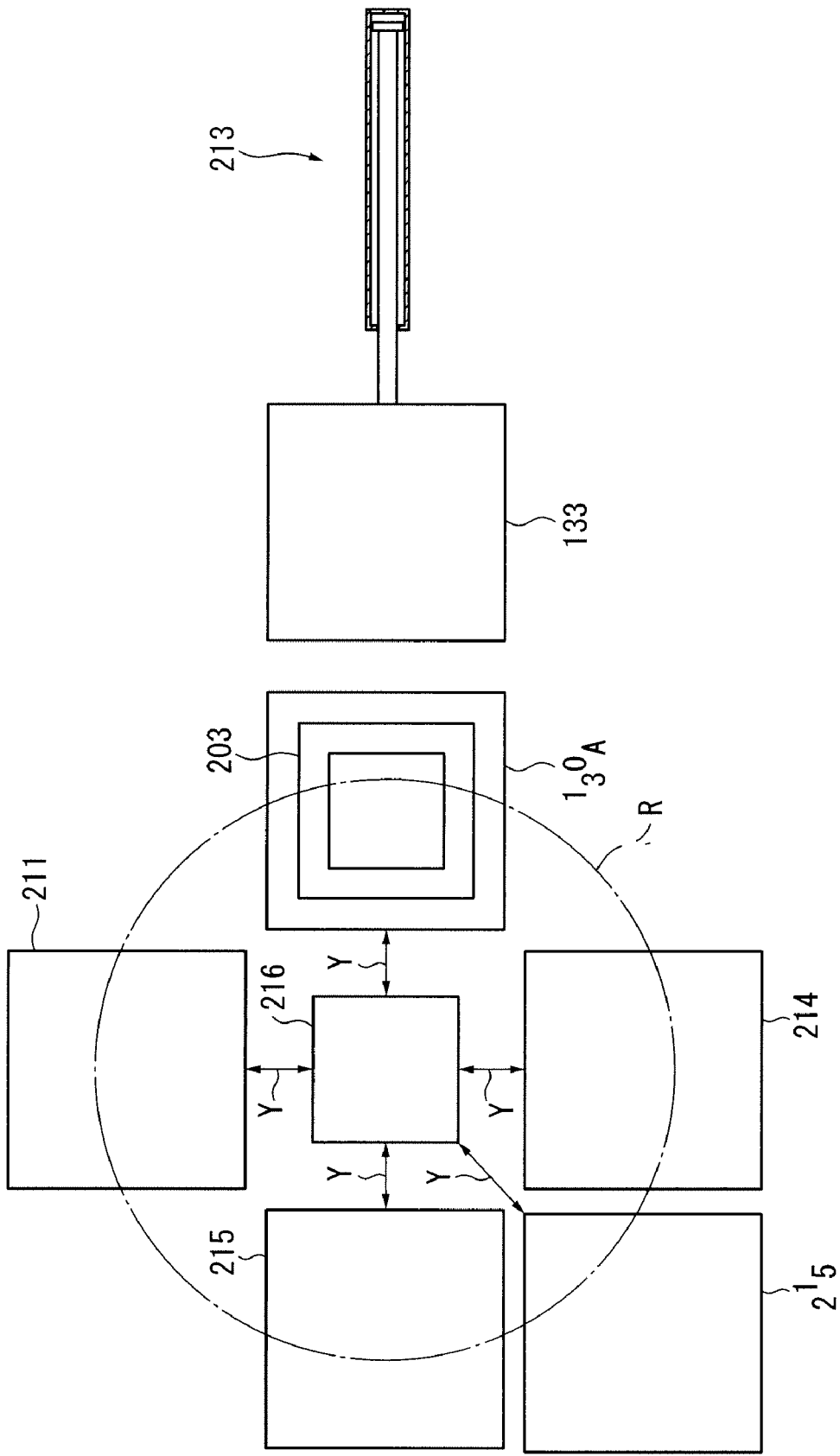
FIG. 10 is a schematic diagram showing a manufacturing machine according to a modification of the present invention.

The number of each of the devices 211, 213, 214 and 215 is preferably adjusted in consideration of a time taken for each step. For instance, when a compression time of the compressing device 214 is 10 seconds, while a cooling time of the cooling device 215 is 20 seconds, it is preferable to provide two cooling devices 215 as shown in FIG. 10. Further, if it takes long to heat the molding die 203, there may be provided a plurality of the heating devices 211.

By adjusting the number of each of the devices 211, 213, 214 and 215 in consideration of the time taken for each step as described above, the molding can be manufactured more smoothly, which is suitable for mass-manufacturing of the molding.

Also, there may be provided a plurality of the mount tables of the transferring device 130 of the filling device 213 in consideration of the time taken for each step.

Although the molding die 203 as a part of the dies is carried by the carrying device 216 to the respective devices 211, 213, 214 and 215 in the above-described embodiment, the entire dies including the pair of molding dies may be carried to the respective devices.

In other words, the pair of molding dies constituting the dies are carried. When the entire dies are carried, a cavity space may be formed by a dent formed on one of the molding dies and a dent formed on the other molding die.

Shapes of the fuel cell 50 (polymer electrolyte fuel cell) and the separator 54 (refer to FIG. 5) to which the present invention is applied in the above-described embodiment is only an example, so that arbitrary arrangements and shapes can be employed without limiting to the shapes of the above-described embodiment.

Specific arrangements and shapes in implementing the present invention may be other arrangements or the like as long as the object of the present invention can be attained.

Although the size of the plurality of grooves 55 formed on the fuel cell separator 54 has the size of 2 mm in width, 0.5 mm in depth and 200 mm in length in the above-described embodiment, the size is not limited thereto.

Figure 11:
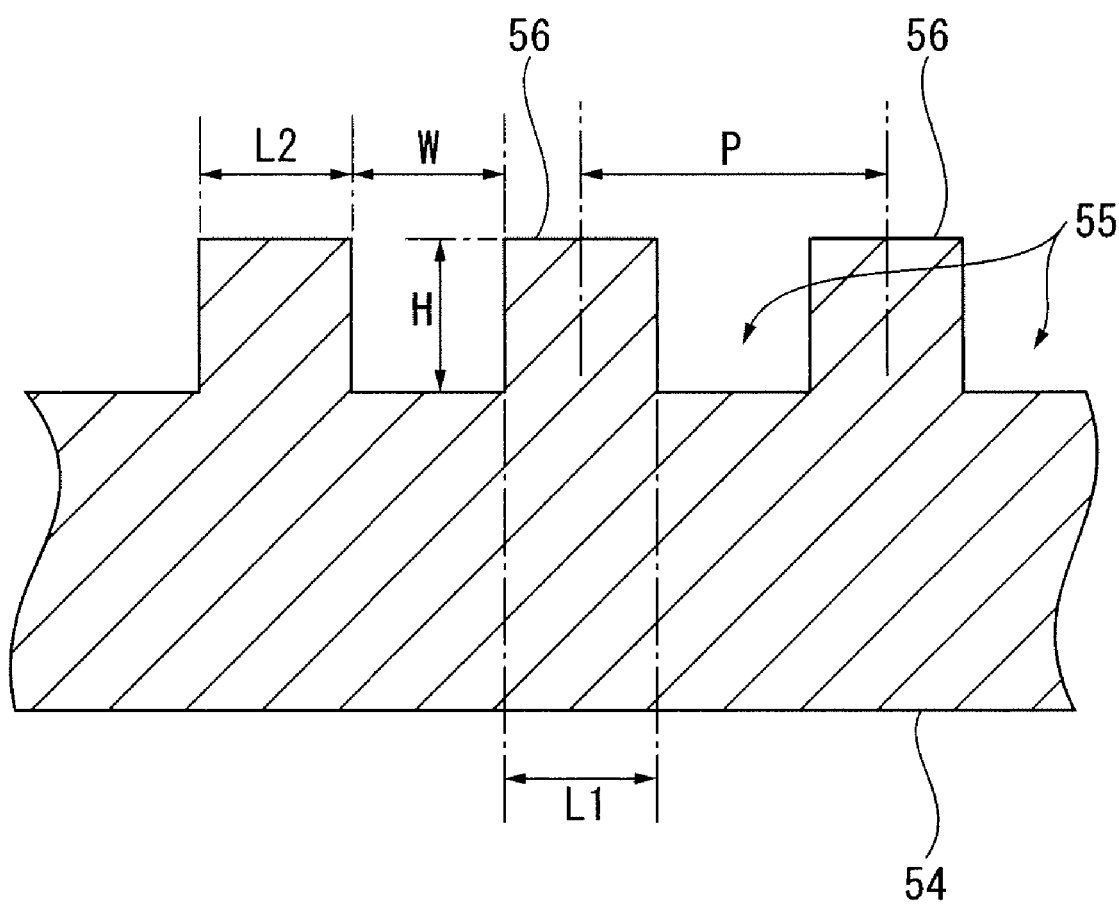
FIG. 11 is a schematic diagram showing a preferable size of the molding of the present invention.

As shown in FIG. 11, the groove 55 formed on the separator 54 as the molding is preferably arranged so that the widths L1 of bottom parts of protruded treads 56 sandwiched between the grooves 55 are 0 to 10 mm, the widths L2 of tops of the protruded treads 56 are 0 to 10 mm (required to be L1≧L2), the heights H of the protruded treads 56 are 0.2 mm or more, the widths W of the grooves 55 are 5 mm or less, and pitch P between the grooves 55 is 15 mm or less.

Although the vertical cross section of the protruded tread 56 is quadrate in FIG. 11, any shape can be employed such as rectangle, trapezoid, semi-sphere, triangle and semi-sphere with a part thereof being cut.

Although the fuel cell separator 54 is exemplified as the molding in the above-described embodiment, the flat antenna, the radiator plate or the like may be manufactured as the molding.

In molding the flat antenna, for instance, fillers having a high dielectric constant (high dielectric constant filler, highly-dielectric filler) such as the calcium titanate, the magnesium titanate, the barium titanate, the strontium titanate, the neodymium titanate and the titanium oxide can be used as the thermally-conductive filler having electrical conductivity. Shapes of the high dielectric constant fillers are preferably spherical and powdery with, for instance, the average particle size of 0.1 to 10 μm.

In molding a radiator plate, metal powders such as the gold powder, the iron powder, the copper powder and the nickel powder can be used as the thermally-conductive filler having electrical conductivity. The average particle size of the metal powders may be around 0.1 to 10 μm, but 1 to 20 μm should be more preferable in use.

The carrying device 216 carries the molding die 203 in the directions shown by the arrows Y in the above-described embodiment, there may be provided a turntable for rotating the carrying device 216. By setting the molding die 203 on the turntable and rotating the turntable, the molding device 203 can be carried to the respective devices 211, 213, 214 and 215 arranged arcuately.

Although the filling device 213 includes the transferring device 130 in the above-described embodiment, the transferring device 130 may not be provided, and instead, the molding die 203 may be directly mounted on the table 134 by the carrying device 216.

Although the filling device 213 includes the extruding device 131 in the above-described embodiment, the filling device may alternatively include an injection compressing device.

EXAMPLE 1

The present invention will be described below in more detail with examples and comparisons, the examples or the like does not limit the present invention.

(Manufacturing of Polyphenylene Sulfide (PPS) Resin Composition)

Components as shown below in (1) to (4) were mixed and dry-blended uniformly using Super Floater mixer (vibration mixer, manufactured by KAWATA MFG. Co., Ltd.) and then melted and kneaded using a twin-screw kneading extruder (TEM35B manufactured by Toshiba Machine Co., Ltd) at melting temperature of 300 to 330° C. and extruded in a pellet form to manufacture a polyphenylene sulfide (PPS) resin composition as the thermoplastic resin composition.

(1) poly(para)phenylene sulfide (PPS) resin (17 wt % of the total)

Grade: LR01G (manufactured by DIC EP Inc.)

Viscosity in melting: 10 Pa·sec (Value at melting temperature of 300° C., shearing speed of 2000 $sec^{-1}$)

(2) graphite (electrically-conductive filler) (77 wt % of the total)

Grade: natural graphite CGC-100H (manufactured by Nippon Graphite Industries, ltd.)

Average particle size (D50%): 100 μm

Bulk density: 0.7 g/cm³ (measured in compliance with JIS K6891)

(3) carbon fiber (electrically-conductive filler) (3 wt % of the total)

Grade: PAN milled carbon fiber HTA-CMF-0160E (manufactured by TOHO TENAX Co., Ltd.)

Fiber diameter: 7 μm

Fiber length: 160 μm (4) polyethylene oxide wax (3 wt % of the total)

Grade: Licowax PED191 (high-density polyethylene (HDPE) oxidized type, manufactured by Clariant Japan)

$M_w$ (weight-average molecular weight): 12000

Oxidation degree: 17 mgKOH/g

With the thermoplastic resin composition (PPS resin composition, same in the following description), the injection compression molding method of the present invention was performed using an injection compression molding machine having the injection compression molding unit shown in FIGS. 1A to 1C (AZ-7000 manufactured by Nissei Plastic Industrial Co., Ltd., Clamping force: 350 tons) in accordance with an injection filling step and a compression forming step described below to obtain a platy molding (size: 200 mm in length×300 mm in width×1.5 mm in thickness) of the present invention (Molding Condition)

Cavity shape: 200 mm in height×300 mm in width×1.5 mm in thickness

Gate shape: 200 mm×2 mm (film gate)

Cylinder temperature: 320° C.

Die temperature: 200° C.

Injection Filling Step

In the injection compression unit shown in FIGS. 1A to 1C, the melted thermoplastic resin composition was injected and filled in the cavity space of the dies so that the thickness of the platy molding would be 2.0 mm. Incidentally, the dies were clamped with low pressure of the clamping force of 50 tons in the injection filling step, the cavity space started moving one second after the starting filling of the thermoplastic resin composition, and the filling of the thermoplastic resin composition was completed simultaneously with the completion of the movement of the cavity space.

Compression Forming Step

Once the melted thermoplastic resin composition was filled in the dies in the above described the injection filling step, the dies were clamped with the high pressure of the clamping force of 350 tons as shown in FIG. 1C simultaneously with the completion of the filling, and then the compression block was moved forward to compress and form the thermoplastic resin composition in the cavity space of the dies with a compression speed of 2 mm/sec and a resin pressure during compression of 58 MPa.

Then, after the compression forming step, the dies were cooled at 200° C. for about 60 seconds to solidify the thermoplastic resin composition in the dies, and the solidified composition was removed from the dies to obtain the platy molding of the present invention.

[Comparison 1]

Injection compression molding was performed in accordance with Example 1 described above except that a position of the cavity space was fixed instead of being moved to mold a platy molding. Incidentally, the cylinder temperature was 320° C. and the die temperature was 200° C. It was so set that then an initial thickness was 2.0 mm, a filling time was 1.5 mm, a filling pressure was 260 MPa at maximum and the compression was started simultaneously when a screw position reaches a pressure-keeping switch position. The gate was a side gate.

[Comparison 2]

A platy molding was obtained by an injection molding method in which the thermoplastic resin composition was injected, filled and cooled without performing the compression forming step in Comparison 1. Incidentally, the cylinder temperature was 320° C. and the die temperature was 200° C. The filling pressure was set to 260 MPa at maximum and the gate was a side gate.

[Test 1]

Volume resistivity and thickness distribution were measured for the platy moldings obtained from Example 1, Comparison 1 and Comparison 2 by a method described below. The results were shown in Tables 1 and 2.

(Volume Resistivity)

A 50 mm square sample was taken from each of three measurement points at directly below the side gate, a central part and an end part (a part remotest from the side gate) and the volume resistivity of the samples were measured using a commercially available resistance meter (LORESTA GP/ASP probe (manufactured by Mitsubishi Chemical Corporation) in compliance with JIS K 7194 and the four-probe method. The results were shown in Table 1.

Incidentally, in Example 1, since the cavity space was moved, the side gate was not used, but samples were taken from positions similar to that in Comparison 1 or the like on the platy molding.

(Thickness Distribution)

Thickness of arbitrary three points on the 50 mm square samples used in the volume resistivity measurement (three samples from each of the Example and Comparisons), namely thickness of nine points were measured using a commercially available micrometer (1/100 mm) to check the maximum value, the minimum value and the deviation (obtained by subtracting the minimum value from the maximum value). The results were shown in Table 2.

(Result: Volume Resistivity)

TABLE 1

| | Volume Resistivity | | |
|---|---|---|---|
| | Below Gate [*1] | Central Part | End Part [*2] |
| Example 1 | 30 | 30 | 30 |
| Comparison 1 | 45 | 45 | 40 |
| Comparison 2 | 80 | 80 | Not measured [*3] |

[*1] A movement starting position of the cavity space in Example 1
[*2] A movement end position of the cavity space in Example 1
[*3] Measurement could not be done because the end part was not filled with the resin composition.

(Result: Thickness Distribution)

TABLE 2

| | Thickness (mm) (Target: 1.5 mm) | | |
|---|---|---|---|
| | Max Value | Min Value | Variation [*4] |
| Example 1 | 1.525 | 1.478 | 0.047 |
| Comparison 1 | 1.63 | 1.372 | 0.258 |
| Comparison 2 | 1.725 | 1.25 | 0.475 |

[*4] Obtained by subtracting minimum value from maximum value (mm)

As indicated by the results in Tables 1 and 2, the platy molding obtained in Example 1 using the injection compression molding method of the present invention had equal volume resistivity at all of the three points, and the value was 30 mΩ·cm, which is low. Regarding the thickness of the molding, differences of the maximum value and the minimum value from a set value and the deviation were small, which showed good thickness distribution.

Thus, it was verified that the platy molding of Example 1 had good thickness distribution and had almost no density gradient with the electrically-conductive filler dispersed uniformly, and further, had high electrical conductivity.

On the other hand, the platy molding obtained in Comparison 1 using a conventional injection compression molding method, the volume resistivities at directly below the gate and the central part were larger than that of the end part, so that the volume resistivites in the molding were not equal. Further, the values were 40 to 45 mΩ·cm, which is higher than the result of the platy molding of Example 1, and the electrical conductivity of which was inferior to that of Example 1. The variation of the thickness distribution was also large and inferior to that of Example 1.

In the platy molding obtained in Example 2 using a conventional injection molding method, the end part of the gate was left unfilled and the molding could not be obtained properly. Further, the volume resistivity was 80 mΩ·m and high, so that the electrical conductivity was low. The thickness distribution was also larger than and inferior to that of Example 1 and Comparison 1.

[Test 2]

In the injection compression molding method shown in Example 1, the injection compression molding was performed with the angle of the gate relative to the moving direction of the cavity space being 45° (Example 2), 90° (right angle relative to the moving direction; Example 3) and 135° (Example 4) to obtain the platy molding. In Example 2, the filling of the cavity space was performed properly without formation of the weld marks, and fine weld marks were not observed either on a surface of the obtained platy molding.

It was verified that, by setting the angle of the gate to 45° (acute angle) relative to the moving direction of the cavity space, the filling pressure of the resin filled in the cavity space can be lowered, so that generation of the fine weld marks could be prevented.

On the other hand, in Example 3, generation of the weld marks were observed during the filling and the fine weld marks were also generated on a surface of the obtained platy molding. In Example 4, generation of the weld marks was significant as compared to Example 3.

[Test 3]

According to the molding method of the present invention, the grooves can be properly transcribed even with low die temperature (normal die temperature for PPS: 120 to 150° C.). In order to verify the characteristic, a test described below was conducted.

EXAMPLE 5

Molding was performed under the conditions below.
Material: PPS+electrically-conductive filler (82.5 wt %)
Cylinder temperature: 360° C.
Die temperature: 140° C.
Filling pressure (effective value): 220 MPa
Injection speed: 40 mm/sec
Compression force: 350 tons
Molding method: in compliance with the first embodiment
(Comparison 3) Molding was performed under the conditions below.
Filling pressure (effective value): 260 MPa (Maximum output of the injection molding machine)

Die temperature: 140° C.
Molding method: conventional method
Other conditions were the same as those of Example 5.
(Comparison 4) Molding was performed under the conditions below.
Filling pressure (effective value): 260 MPa (Maximum output of the injection molding machine)
Die temperature: 230° C.
Molding method: conventional method
Other conditions were the same as those of Example 5.
(Measurement of Imprint Rate of Grooves)
Imprint rate of grooves (%)=(total area of grooves−area of chipped part)/total area of grooves Clearly chipped parts that could be visually observed were employed as the chipped part of the grooves.

When unfilled part was remained, an area of grooves on the unfilled molding was employed as the total area of the grooves.

Chips on the grooves were significantly generated on the grooves intersecting with a flowing direction of the thermoplastic resin composition.

(Measurement Result)

In Example 5, the filling was completed and the transcription rate of the grooves was 100%.

In Comparison 3, an unfilled part was generated even though the filling pressure was increased, and the transcription rate of the groove was 30%.

In Comparison, although the filling could be completed by raising the die temperature, the transcription rate of the grooves was 80%.

Therefore, it was verified that the transcription performance of the grooves could also be enhanced by the present invention. Further, a sufficient transcription performance can be achieved without raising the die temperature (around melting point of PPS: 280° C.) unlike the conventional method, so that the molding cycle can be shortened.

[Test 4]

In Test 2, it was verified that generation of the weld marks could be prevented by setting the gate angle to an acute angle in the molding method of the present invention. Further, in order to verify how the gate angle influenced the transcription performance of the grooves, the following test was conducted.

EXAMPLE 6

Molding was performed under the conditions below.
Material: PPS+electrically-conductive filler (82.5 wt %)
Cylinder temperature: 340° C.
Die temperature: 140° C.
Molding method: gate angle=45° (acute angle), the cavity space was moved from the left to the right as shown in FIGS. 6A to 6C.
Other conditions are the same as those of Example 5.

EXAMPLE 7

Molding was performed under the conditions below.
Molding method: gate angle=obtuse angle, the gate was moved in the cavity space from the right to the left, which was opposite to FIG. 6.
Other conditions are the same as those of Example 6.
(Measurement Result)
In Example 6, the filling was completed and the transcription rate of the grooves was 100%.
In Example 7, the transcription rate of the grooves was 20%, and the chips on the grooves were significant.

Therefore, it was verified that the transcription performance could also be enhanced by setting the gate angle to an acute angle in the present invention.

INDUSTRIAL APPLICABILITY

An injection compression molding method of the present invention is capable of performing an injection compression molding of a thermoplastic resin composition containing a high content of a thermally-conductive filler such as an electrically-conductive filler, so that the present invention is applicable to manufacturing a molding such as fuel cell separator and a flat antenna.

The invention claimed is:

1. An injection compression molding method for obtaining a molding by injecting and filling a melted material containing a thermoplastic resin in a cavity space formed in dies through a gate and by compressing and forming the material in the cavity space, the method comprising:
   clamping the dies with a low pressure and injecting and filling the melted material in the cavity space from the gate while moving the cavity space relative to the gate in a moving direction; and
   clamping the dies with a high pressure substantially simultaneously with completion of the filling to compress and form the material filled in the cavity space,
   wherein a direction in which the material is injected and filled forms an acute angle with the moving direction of the cavity space.

2. The injection compression molding method according to claim 1, wherein the acute angle is in the range of 25° to 75°.

3. The injection compression molding method according to claim 1, wherein the compressing and forming of the material filled in the cavity space is performed by moving a compression block disposed in the dies toward the cavity space.

4. The injection compression molding method according to claim 1 wherein,
   a manufacturing machine is used, the manufacturing machine including:
   dies including a pair of molding dies disposed opposite to each other with the cavity space formed therein;
   a heating device which heats at least one of the molding dies which includes a dent as the cavity space;
   a filling device which fills the melted material in the cavity space;
   a compressing device which compresses and forms the material filled in the cavity space;
   a cooling device which cools the material in the cavity space; and
   a carrying device which carries the dies or one of the molding dies to the respective devices and the heating device, the filling device, the compressing device and the cooling device being arranged substantially on a single circle, wherein
   the manufacturing machine performs:
   heating the dies or one of the molding dies with the heating device;
   filling the melted material in the cavity space while moving the cavity space relative to the gate with the filling device;
   compressing and forming the material in the cavity space with the compressing device; and
   cooling the material in the cavity space with the cooling device.

5. The injection compression molding method according to claim 4, wherein
   a temperature of the dies or one of the molding dies is set to equal to or higher than a melting point of the thermoplastic resin during filling, and
   the temperature of the dies or one of the molding dies is so adjusted that the temperature reaches a temperature equal to or lower than a crystallization temperature of the thermoplastic resin after starting the compressing and forming of the material filled in the cavity space.

6. The injection compression molding method according to claim 1, wherein the moving direction of the cavity space is substantially linear.

* * * * *